US011782144B2

(12) United States Patent
Wang et al.

(10) Patent No.: US 11,782,144 B2
(45) Date of Patent: Oct. 10, 2023

(54) LIDAR AND ADJUSTMENT METHOD THEREOF

(71) Applicant: SUTENG INNOVATION TECHNOLOGY CO., LTD., Shenzhen (CN)

(72) Inventors: Ji Wang, Shenzhen (CN); Yong Zhou, Shenzhen (CN); Songshan Hou, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 103 days.

(21) Appl. No.: 16/758,853

(22) PCT Filed: Feb. 5, 2020

(86) PCT No.: PCT/CN2020/074320
§ 371 (c)(1),
(2) Date: Apr. 23, 2020

(87) PCT Pub. No.: WO2020/199747
PCT Pub. Date: Oct. 8, 2020

(65) Prior Publication Data
US 2022/0018947 A1    Jan. 20, 2022

(30) Foreign Application Priority Data

Apr. 4, 2019  (WO) ................ PCT/CN2019/081578
Apr. 9, 2019  (WO) ................ PCT/CN2019/104431

(51) Int. Cl.
*G01C 3/08*    (2006.01)
*G01S 7/497*   (2006.01)
(Continued)

(52) U.S. Cl.
CPC .......... *G01S 7/4972* (2013.01); *G01S 7/4812* (2013.01); *G01S 17/02* (2013.01)

(58) Field of Classification Search
None
See application file for complete search history.

(56) References Cited

U.S. PATENT DOCUMENTS 6,747,267 B1   6/2004  Balasubramaniam
10,211,593 B1  2/2019  Lingvay et al.
(Continued)

FOREIGN PATENT DOCUMENTS

CN   101614820 A   12/2009
CN   101738609 A   6/2010
(Continued)

OTHER PUBLICATIONS

International Search Report issued in corresponding International Application No. PCT/CN2019/081578, dated Dec. 24, 2019, 5 pages.
(Continued)

*Primary Examiner* — Mark Hellner
(74) *Attorney, Agent, or Firm* — BAYES PLLC

(57) ABSTRACT

This application provides an optical device, including an emitting assembly configured to emit an outgoing light signal, a beam splitting assembly configured to pass the outgoing light signal from the emitting assembly to a detection region, receive a reflected light signal from the detection region, and modify a transmission direction of the reflected light signal, a receiving assembly configured to receive the reflected light signal from the beam splitting assembly after the direction modification and generate an electrical signal in response to the reflected light signal. Also disclosed is a method of adjusting an optical device as described herein.

19 Claims, 8 Drawing Sheets

(51) Int. Cl.
*G01S 7/481* (2006.01)
*G01S 17/02* (2020.01)

(56) References Cited

U.S. PATENT DOCUMENTS

| | | | |
|---|---|---|---|
| 2009/0129420 A1 | 5/2009 | Regaard et al. | |
| 2016/0170024 A1 | 6/2016 | Böckem et al. | |
| 2016/0356706 A1 | 12/2016 | Kurtz et al. | |
| 2017/0131388 A1 | 5/2017 | Campbell et al. | |
| 2018/0172803 A1 | 6/2018 | Liang et al. | |
| 2018/0210069 A1 | 7/2018 | Mase et al. | |
| 2018/0286909 A1 | 10/2018 | Eichenholz et al. | |
| 2019/0113622 A1* | 4/2019 | Wu | G01S 7/4812 |

FOREIGN PATENT DOCUMENTS

| | | | | |
|---|---|---|---|---|
| CN | 102230962 A | 11/2011 | | |
| CN | 102520524 A | 6/2012 | | |
| CN | 103323957 A | 9/2013 | | |
| CN | 103675795 A | 3/2014 | | |
| CN | 105277931 A | 1/2016 | | |
| CN | 205067745 U | 3/2016 | | |
| CN | 105911562 A | 8/2016 | | |
| CN | 106443699 A | 2/2017 | | |
| CN | 107356911 A | 11/2017 | | |
| CN | 207336754 U | 5/2018 | | |
| CN | 108132472 A | 6/2018 | | |
| CN | 108139468 A | 6/2018 | | |
| CN | 108226898 A | 6/2018 | | |
| CN | 108226899 A | 6/2018 | | |
| CN | 108594206 A | 9/2018 | | |
| CN | 108627813 A | 10/2018 | | |
| CN | 108955563 A | 12/2018 | | |
| CN | 108988951 A | 12/2018 | | |
| CN | 109031243 A | 12/2018 | | |
| CN | 109031244 A | 12/2018 | | |
| CN | 109061667 A | 12/2018 | | |
| CN | 109324376 A | 2/2019 | | |
| CN | 109343067 A | 2/2019 | | |
| CN | 109375230 A * | 2/2019 | | G01S 17/02 |
| CN | 109387550 A * | 2/2019 | | G01S 7/4812 |
| CN | 109597050 A | 4/2019 | | |
| CN | 109613515 A | 4/2019 | | |
| CN | 109709572 A | 5/2019 | | |
| CN | 109991585 A | 7/2019 | | |
| DE | 102017214705 A1 | 2/2019 | | |
| JP | 2002148562 A | 5/2002 | | |
| JP | 2009520353 A | 5/2009 | | |
| KR | 101884781 B1 | 8/2018 | | |

OTHER PUBLICATIONS

First Office Action issued in related Chinese Application No. 201980002537.2, dated Mar. 27, 2023, 17 pages.
European Search Report issued in corresponding European Application No. EP19920889.3, dated Nov. 21, 2022, 15 pages.
International Search Report issued in corresponding International Application No. PCT/CN2019/104431, dated May 27, 2020, 5 pages.
First Office Action issued in related Chinese Application No. 201980002536.8, dated Feb. 11, 2023, 8 pages.
International Search Report issued in corresponding International Application No. PCT/CN2020/074320, dated Apr. 22, 2020, 5 pages.
European Search Report issued in corresponding European Application No. EP20784075.2, dated Nov. 25, 2022, 10 pages.

* cited by examiner

```
┌─────────────────────────────────────────────────────────────────────────┐
│ S201: Beam splitter assembly is fixed to base, light exit port of emitting assembly is │
│       aligned with first port of beam splitting assembly, and emitting assembly is fixed │
│       to base.                                                          │
└─────────────────────────────────────────────────────────────────────────┘
                                    ↓
┌─────────────────────────────────────────────────────────────────────────┐
│ S202: Reflector supporting assembly of reflector assembly is fixed above beam splitting │
│       assembly, and light input port of reflector assembly is aligned with second port of │
│       beam splitting assembly                                           │
└─────────────────────────────────────────────────────────────────────────┘
                                    ↓
┌─────────────────────────────────────────────────────────────────────────┐
│ S203: Light input port of receiving assembly is aligned with light exit port of reflector │
│       assembly, and receiving assembly is fixed to reflector assembly   │
└─────────────────────────────────────────────────────────────────────────┘
                                    ↓
┌─────────────────────────────────────────────────────────────────────────┐
│ S204: Reflected light signal is received by receiving assembly; outgoing light signal │
│       enters beam splitting assembly through first port and exits through third port and │
│       is transmitted to detection region; at least part of outgoing light signal is │
│       reflected by target object in detection region and return as reflected light signal; │
│       reflected light signal enters through third port of beam splitting assembly and is │
│       directed by beam splitting assembly to reflector assembly through second port; │
│       reflector in reflector assembly further directs reflector light to receiving assembly │
└─────────────────────────────────────────────────────────────────────────┘
                                    ↓
┌─────────────────────────────────────────────────────────────────────────┐
│ S205: Reflected light signal is compared with preset light signal threshold │
└─────────────────────────────────────────────────────────────────────────┘
                                    ↓
┌─────────────────────────────────────────────────────────────────────────┐
│ S206: When reflected light signal is smaller than preset light signal threshold, at least │
│       one of position and angle of reflector in reflector assembly is adjusted │
└─────────────────────────────────────────────────────────────────────────┘
                                    ↓
┌─────────────────────────────────────────────────────────────────────────┐
│ S207: When reflected light signal is greater than or equal to preset light signal threshold, │
│       current position of reflector in reflector assembly is deemed desired position │
└─────────────────────────────────────────────────────────────────────────┘
                                    ↓
┌─────────────────────────────────────────────────────────────────────────┐
│ S208: Reflector is fixed to reflector supporting assembly corresponding to desired │
│       position                                                          │
└─────────────────────────────────────────────────────────────────────────┘
```

FIG. 13

LIDAR AND ADJUSTMENT METHOD THEREOF

RELATED APPLICATIONS

The present patent document claims priority of PCT Application No. PCT/CN2019/081578, filed Apr. 4, 2019, and PCT Application No. PCT/CN2019/104431, filed Sep. 4, 2019, the entire contents of each of which are incorporated herein by reference.

BACKGROUND

Technical Field Text

The present application relates to the field of The Lidar, and in particular, to a Lidar and an adjustment method thereof.

Background Information

Lidar is a radar system that emits a laser beam to detect a target object's position, velocity, and other characteristic quantities. Its working principle is that a transmitting assembly first emits an outgoing light signal towards a target object, and then a receiving assembly receives the light signal reflected from the target object. The reflected light signal is then compared with the outgoing light signal. After processing, relevant information of the target object, such as parameters of distance, orientation, height, speed, attitude, and even shape of the target object, can be obtained.

Currently, because sizes of laser emission aperture and laser receiving aperture of coaxial optical path of Lidar are limited, the detection effect and detection distance of Lidar are limited. As a result, the coaxial optical path of Lidar frequently falls to meet detection requirements. In addition, the field of view of a single emitting assembly and the field of view of a single receiving assembly in a Lidar under the coaxial design are insufficient to meet the detection requirements. Therefore, some Lidars adopt multiple emitting assemblies to splice the emitting field of view and multiple receiving assemblies to splice the receiving field of view to expand their scanning ranges.

Usually, multiple emitting assemblies form an emitting system, and multiple receiving assemblies form a receiving system. The emitting system and the receiving system may be adjusted independently. However, a Lidar includes many optical components accurately and compactly assembled within a limited inner space. The optical components may mutually affect performances of each other during adjustment. Consequently, adjusting and calibrating an existing Lidar is complicated, difficult, and inefficient. In addition, existing Lidar design causes high maintenance and service costs.

BRIEF SUMMARY

According to one embodiment of the present disclosure, an optical device and a method of adjusting an optical device are provided.

According to an aspect of the present disclosure, an optical device may include an emitting assembly configured to emit an outgoing light signal; a beam splitting assembly configured to pass the outgoing light signal from the emitting assembly to a detection region, receive a reflected light signal from the detection region, and modify a transmission direction of the reflected light signal, wherein the reflected light signal comprises at least a part of the outgoing light signal reflected by an object in the detection region; and a receiving assembly configured to receive the reflected light signal from the beam splitting assembly after the direction modification and generate an electrical signal in response to the reflected light signal.

The optical device may further include a reflector assembly disposed between the beam splitting assembly and the receiving assembly and configured to direct the reflected light signal from the beam splitting assembly to the receiving assembly. The optical device may further include a reflector assembly disposed between the emitting assembly and the beam splitting assembly and configured to direct the outgoing light signal from the emitting assembly to the beam splitting assembly. The optical device may further include a collimating assembly disposed between the emitting assembly and the beam splitting assembly and configured to modify emission characteristics of the outgoing light signal along a first axis and a second axis, the first axis and the second axis being perpendicular to the transmission direction. The first axis is a fast axis and the second axis is a slow axis of the outgoing light signal.

The optical device may further include a focusing assembly configured to receive the reflected light signal from the beam splitting assembly and converge the reflected light signal onto the receiving assembly. The optical device may further include a secondary beam splitting assembly disposed between the emitting assembly and the beam splitting assembly and configured to removing an unwanted part of the outgoing light signal. The optical device may further include a beam reducing assembly disposed between the emitting assembly and the beam splitting assembly and configured to reduce a dimension of the outgoing light signal. The beam reducing assembly may reduce the dimension of the outgoing light signal by one half. The dimension reduction is measured along a direction perpendicular to the transmission direction.

According to an aspect of the present disclosure, an optical device may include a first optical transceiver component configured to emit a first outgoing light signal along a first optical axis to a detection region and receive a first reflected light signal along the first optical axis returning from the detection region; a second optical transceiver component configured to emit a second outgoing light signal along a second optical axis to the detection region and receive a second reflected light along the second optical signal axis returning from the detection region; a galvanometer assembly configured to receive the first outgoing light signal and the second outgoing light signal from the first optical transceiver component and the second optical transceiver component, respectively, and direct the first reflected light signal and the second reflected light signal to the first optical transceiver component and the second optical transceiver component, respectively; and a bottom plate configured to secure relative positions of the first optical transceiver component, the second optical transceiver component, and the galvanometer assembly.

The first optical transceiver component may have a first field of view corresponding to the first outgoing light signal and the first reflected light signal. The second optical transceiver component may have a second field of view corresponding to the second outgoing light signal and the second reflected light signal. The first field of view and the second field of view partially overlap.

The optical device may further include a first reflector and a second reflector disposed on the bottom plate. The first reflector is configured to direct the first outgoing light signal from the first optical transceiver component to the galvanometer assembly, and the second reflector is configured to direct the second outgoing light signal from the second optical transceiver component to the galvanometer assembly.

The optical device may further include a third optical transceiver component configured to emit a second outgoing light signal along a third optical axis to the detection region and receive a second reflected light along the third optical signal axis returning from the detection region. The first, second, and third optical transceiver components are arranged substantially in a plane.

According to another aspect of the present disclosure, a method for adjusting an optical device may include aligning an emitting assembly and a beam splitting assembly; coupling a receiving assembly to the beam splitting assembly; emitting, by the emitting assembly, an outgoing light signal to a detection region through the beam splitting assembly along a first transmission direction, wherein the beam splitting assembly receives a reflected light signal from the detection region and direct the reflected light signal along a second transmission direction to the receiving assembly, the reflected light signal comprising at least a part of the outgoing light signal reflected from the detection region; detecting the reflected light signal directed from the beam splitting assembly to the receiving assembly; comparing the reflected light signal with a threshold value; and adjusting the optical transceiver component until the reflected light signal received by the receiving assembly is greater than or equal to the threshold value.

Adjusting the optical transceiver component until the reflected light signal received by the receiving assembly is greater than or equal to the threshold value may further include adjusting the receiving assembly with respect to the beam splitting assembly until the reflected light signal received by the receiving assembly is greater than or equal to the threshold value.

The method may further include fixing the receiving assembly with respect to the beam splitting assembly. Aligning the emitting assembly and a beam splitting assembly may further include coupling the emitting assembly to a reflector assembly; and aligning the emitting assembly, the reflector assembly and the beam splitting assembly. Fixing the emitting assembly with respect to the beam splitting assembly may further include fixing the reflector assembly and the beam splitting assembly to a bottom plate; and fixing the emitting assembly to the reflector assembly.

The method may further include fixing a reflector assembly to the beam splitting assembly. Coupling the receiving assembly to the beam splitting assembly may further include aligning the receiving assembly with the reflector assembly; coupling the receiving assembly to the beam splitting assembly through the reflector assembly fixed to the beam splitting assembly; and fixing the receiving assembly to the reflector assembly. Adjusting the optical transceiver component until the reflected light signal received by the receiving assembly is greater than or equal to the threshold value may further include adjusting a reflector within the reflector assembly until the reflected light signal received by the receiving assembly is greater than or equal to the threshold value; and fixing the reflector within the reflector assembly.

BRIEF DESCRIPTION OF THE DRAWINGS

FIG. 13 is a Lidar adjustment method according to some embodiments of the present application.

DETAILED DESCRIPTION OF THE DRAWINGS AND THE PRESENTLY PREFERRED EMBODIMENTS

In order to facilitate understanding of the present invention, and in order to make the above-mentioned objects, features, and advantages of the present invention more comprehensible, specific embodiments of the present invention will be described in detail below with reference to the accompanying drawings. In the following description, many specific details are set forth in order to fully understand the present invention, and the preferred embodiments of the present invention are shown in the accompanying drawings. However, the invention can be implemented in many different forms and is not limited to the embodiments described herein. Rather, these embodiments are provided to provide a thorough understanding of the present disclosure. The present disclosure can be implemented in many other ways than described herein, and those skilled in the art can make similar improvements without departing from the content of the present invention, so the present invention is not limited by the specific embodiments disclosed below.

In addition, the terms "first" and "second" are used for descriptive purposes only and cannot be understood as indicating or implying relative importance or implicitly indicating the number of technical features. Therefore, the features defined as "first" and "second" may explicitly or implicitly include at least one of the features. In the description of the present disclosure, the meaning of "plurality" is at least two, for example, two, three, etc., unless it is specifically and specifically defined otherwise.

Unless defined otherwise, all technical and scientific terms used herein have the same meaning as commonly understood by one of ordinary skill in the art to which this disclosure belongs. The term "and/or" as used herein includes any and all combinations of one or more of the associated listed items.

Figure 1:
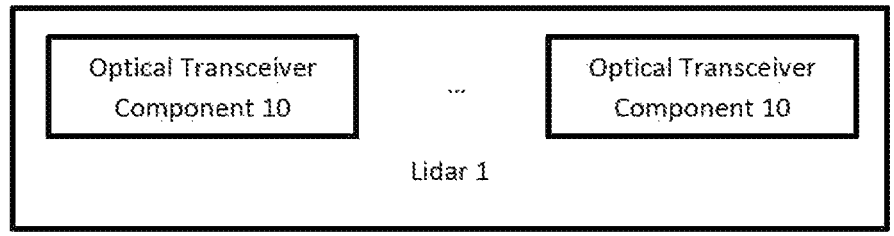
FIG. 1 is a schematic diagram of a Lidar according to some embodiments of the present application.

FIG. 1 is a schematic diagram of a Lidar 1 according to some embodiments of the present application. The Lidar 1 in the present application may include at least one optical transceiver component 10 mounted on a base (not shown in FIG. 1). The optical transceiver component 10 may transmit an outgoing light signal to a target object and receive a reflected light signal reflected by the target object. The optical transceiver component 10 may then compare the reflected light signal with the outgoing light signal, and obtain information about parameters of the target object, such as distance, position, altitude, speed, posture, and even shape. The target object may be a moving object, e.g., automobiles, aircraft, and even birds, fish, etc. The target object may also be a still object, such as the ground, buildings, and the like. The Lidar 1 may be mounted on a moving object, for example, mounted on an automobile to detect objects appear to the surrounding of the automobile. The Lidar 1 may also be mounted on a stationary object, such as being mounted on a fixed position to detect the speed of a moving object and the like. The Lidar 1 may include one optical transceiver component 10, but may also include a plurality of optical transceiver components 10. The number of the optical transceiver components 10 may be determined by actual need, which is not limited by the present application. Each optical transceiver component 10 may have a limited horizontal field of view angle. When the Lidar 1 needs a larger horizontal field of view angle, the Lidar 1 may adopt a plurality of optical transceiver components 10 each with a smaller field of view angle, and combine or splice them horizontally to achieve the larger horizontal field of view angle required by an application. For example, when a 120° horizontal field of view angle is required for the Lidar 1, four optical transceiver components 10 each with a 30° field of view angle may be adopted by the Lidar 1, in which the horizontal fields of view angle of the four optical transceiver components 10 are combined or spliced horizontally.

Figure 2:
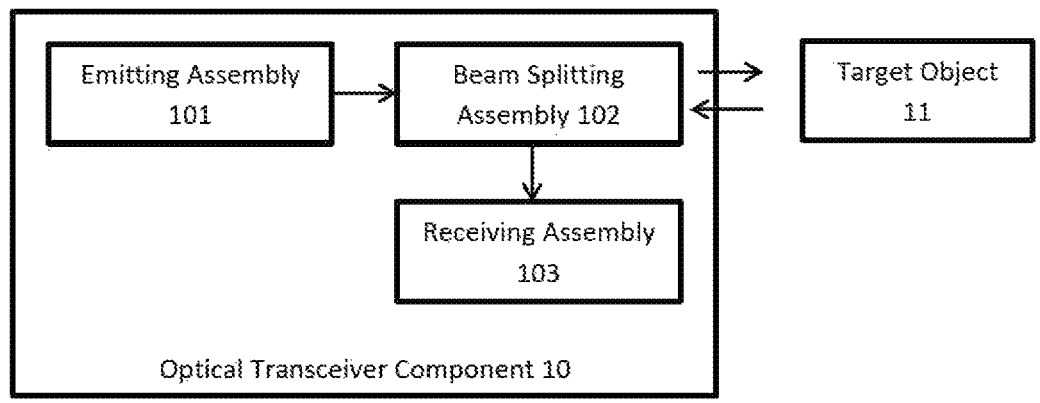
FIG. 2 is a schematic diagram of a Lidar's optical transceiver component according to some embodiments of the present application.

FIG. 2 is a schematic diagram of the optical transceiver component 10 of Lidar 1 according to some embodiments of the present application. The optical transceiver component 10 may include at least one emitting assembly 101, at least one beaming splitting assembly 102, and at least one receiving assembly 103. The emitting assembly may emit an outgoing light signal, which may pass through the beam splitting assembly 102 and then reach a detection region having a target object 11. At least a part of the outgoing light signal may then be reflected by the target object 11 in the detection region and become a reflected light signal received by the beam splitting assembly 102. The reflected light signal is then directed by the beam splitting assembly 102 to the receiving assembly 103. In addition, the optical transceiver component 10 may also Include a base (not shown in FIG. 2). The emitting assembly 101, beaming splitting assembly 102, and the receiving assembly 103 are mounted on and fixed to the base.

According to some embodiments, the emitting assembly 101 may include a laser generator and a collimating assembly. The laser generator is used to generate an original laser signal. The collimating assembly is configured to collimate the laser signal generated by the laser generator and emit the collimated laser signal as the outgoing light signal. The laser generator may generate a semiconductor laser, a fiber laser, and the like, or any combinations thereof. Optionally, the collimating assembly may include a spherical lens, a spherical lens group, a cylindrical lens group, a cylindrical lens and a spherical lens group, an aspherical lens, and a gradient index lens, and the like, or any combinations thereof. According to another embodiment, the collimating assembly may be separated from the emitting assembly.

Further, during installation and adjustment of the emitting assembly 101, the laser generator may first generate a laser beam. The laser beam is then collimated by the collimating assembly. When the emission assembly 101 is adjusted, a divergence angle may be calculated by measuring the spot size of the outgoing laser beam after collimation. The emitting assembly 101 is deemed properly adjusted when the divergence angle is less than or equal to a preset threshold of divergence angle; otherwise, the collimating assembly 101 may need further adjustment to reduce the divergence angle until the divergence angle is less than or equal to the present divergence angle threshold.

According to some embodiments, the receiving assembly 103 may Include a detector and a focusing assembly. The focusing assembly may be configured to receive and converge the reflected light signal. The detector may be configured to receive the reflected light signal converged by the focusing assembly. Additionally, the focusing assembly may also include a ball lens, a ball lens group, a cylindrical lens group or any combinations thereof. The detector may be an avalanche photo diode (APD), a silicon photomultiplier (SIPM), an APD array, a multi-pixel photon counter (MPPC), or a photomultiplier tube (PMT), and/or a single-photon avalanche diode (SPAD), etc.

Further, when the receiving assembly 103 is installed and adjusted, a laser beam may first be inputted to the focusing assembly. When it is determined that the laser beam is converged on the surface of the detector after passing through the focusing assembly, the receiving assembly 103 may be deemed properly adjusted. Otherwise the adjustment of the focusing assembly may be continued until the laser beam is converged on the surface of the detector.

The beam splitting assembly 102 may let the outgoing light signal pass through, but at the same time may deflect or direct the coaxially incident reflected light signal toward the receiving assembly 103.

Specifically, the outgoing light signal emitted from the emitting assembly 101 may pass through the beam splitting assembly 102 and be transmitted towards the detection region. When the target object 11 is in the detection region, at least a part of the outgoing light signal may be reflected by the target object 11 to become the reflected light signal. The reflected light signal may enter into the beaming splitting assembly 102 when returning to the Lidar 1. Rather than passing though the beaming splitting assembly 102 as does the outgoing light signal, the reflected light signal may be deflected or directed by the beaming splitting assembly 102 toward the receiving assembly 103 and received by the receiving assembly 103.

According to some embodiments, the optical transceiver component 10 may also include a reflector assembly 104. The reflector assembly 104 may be positioned between the beam splitting assembly 102 and the receiving assembly 103 in one embodiment. The reflector assembly 104 may also be positioned between the emitting assembly 101 and the beam splitting assembly 102 in another embodiment.

Figure 3:
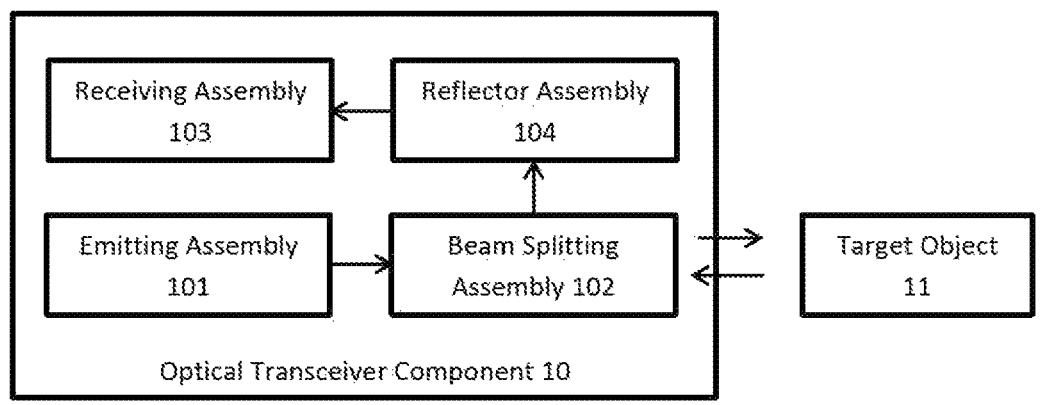
FIG. 3 is a schematic diagram of a Lidar's optical transceiver component according to some embodiments of the present application.

FIG. 3 is a schematic diagram of the optical transceiver component 10 according to some embodiments of the present application. In addition to the parts of the optical transceiver component 10 shown in FIG. 2, the optical transceiver component 104 in FIG. 3 may include a reflector assembly 104. The reflector assembly 104 maybe positioned between the beam splitting assembly 102 and the receiving assembly 102, so that after deflected by the beam splitting assembly 102, the reflected light signal may be further reflected or directed by the reflector assembly 104 to the receiving assembly 103. The reflected light signal after being reflected or directed by the reflector assembly 104 may have a first optical axis. The outgoing light signal after passing though the beam splitting assembly 102 may have a second optical axis. The first optical axis and the second optical axis may be parallel or may form an angle, as long as the reflected light signal enters the receiving assembly. The reflector assembly 104 may be configured to fold or change the light path of the receiving light signal so as to reduce the size of the optical transceiver component 10.

Specifically, the outgoing light signal emitted by the emitting assembly 101 is transmitted to a detection region after passing through a beam splitting assembly 102. At least part of the outgoing light signal may then be reflected by a target object in the detection region and become the reflected light signal. The reflected light signal may subsequently incident into the beam splitting assembly 102, be deflected or directed to the reflector assembly 104, then be reflected or directed by the reflector assembly 104 to the receiving assembly 103, and finally be received by the receiving assembly 103.

Figure 4:
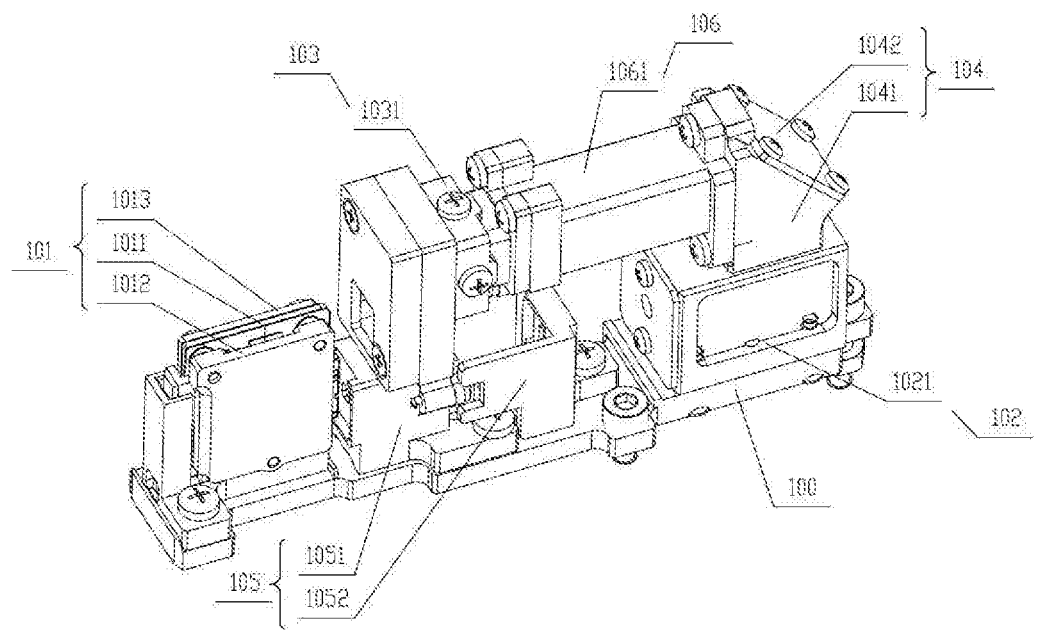
FIG. 4 is a schematic structural diagram of a Lidar's optical transceiver component according to some embodiments of the present application.

FIG. 4 is a schematic structural diagram of optical transceiver component according to some embodiments of the present application. Optical transceiver component 10 may include an emitting assembly 101, a beam splitting assembly 102, a reflector assembly 104, and a receiving assembly 103. Additionally, the optical transceiver component 10 in FIG. 4 may further include a base 100, a collimating assembly 105, and a focusing assembly 106.

As shown in FIG. 4, the emitting assembly 101, the collimating assembly 105, and the beam splitting assembly 102 may be sequentially arranged on the base 100 from left to right. An outgoing light signal, such as a laser beam, may travel all the way through the collimating assembly 105 and the beam splitting assembly 102 to reach a detection region. When the reflected light signal travels back, it may be received by the beam splitting assembly 102 and then be deflected or directed upward to the reflector assembly 104, which deflect or direct the reflected light signal to the left to the receiving assembly 103. Therefore, the light path of the reflected light signal between the reflector assembly 104 and the receiving assembly 103 may be parallel or substantially parallel to the light path of the outgoing light signal between the emitting assembly 101 and the beam splitting assembly 102.

The base 100 may be a mounting base of the optical transceiver component 10. At least one optical transceiver component 10 may be mounted and fixed on the base 100. When installed, each of the at least one optical transceiver component 10 may correspond to an installation angle. Specifically, each optical transceiver component 10 may be positioned such that the light path of the outgoing light signal or the light path of the reflected light signal of each optical transceiver component 10 described above may have a unique transmission direction that corresponds to the installation angle of the respective optical transceiver component 10. Therefore, each of the at least one optical transceiver component 10 may simply be mounted and fixed on the base 100 according to its corresponding installation angle. In addition, the material and shape of the base 100 may be determined according to actual use, which is not limited in this disclosure.

Figure 5:
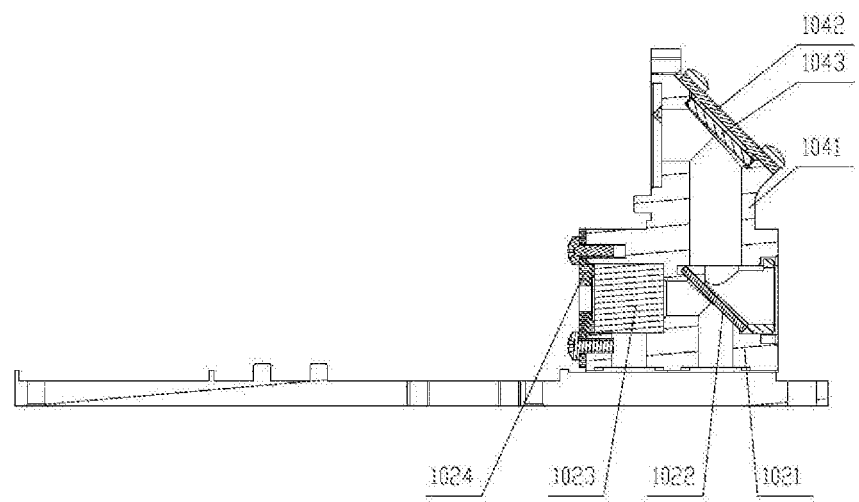
FIG. 5 is a cross-sectional view of a Lidar's beam splitting assembly and reflector assembly according to some embodiments of the present application.

FIG. 5 is a cross-sectional view of the beam splitting assembly 102 and the reflector assembly 104 according to some embodiments of the present application. As shown in FIG. 5, the beam splitting assembly 102 and the base 100 may be an integrated part or fixedly connected. The beam splitting assembly 102 may be fixed corresponding to the installation angle, as described above, on the base 100. The emitting assembly 101 and the receiving assembly 103 may be installed using the position of the beam splitting assembly 102 as a reference. The emitting assembly 101 may be fixedly connected to the base 100 and may be aligned with the beam splitting assembly 102. Specifically, during installation, the emitting assembly 101 may first be aligned with the beam splitting assembly 102 so that the outgoing light signal emitted from the emitting assembly 101 may be directed toward the beam splitting assembly 102, and the emitting assembly 101 may then be fixed to the base 100. In addition, the connection between the emitting assembly 101 and the base 100 may use one or more of a snap connection, a screw connection, a connection through pin(s), an adhesive connection, and any combinations thereof.

The beam splitting assembly 102 may include a beamsplitter supporting assembly 1021 and a beamsplitter 1022. The beamsplitter 1022 may be a polarizing beamsplitter, a reflector with a center whole, a semi-transparent reflector, or the like. The beamsplitter supporting assembly 1021 may be formed as part of the base 100 or may be fixedly connected to the base 100. The beamsplitter 1022 may be mounted and fixed in the beamsplitter supporting assembly 1021. The beamsplitter supporting assembly 1021 may be of a cubic structure (e.g., a cubic housing). The beamsplitter supporting assembly 1021 may include a mounting position inside the housing, so that the beamsplitter 1022 may be mounted on and fixed to the mounting position at a preset tilt angle and position. For example, the mounting position of the beamsplitter supporting assembly 1021 may include a mounting surface being pre-built with the preset tilt angle, so that when installed, the beamsplitter 1022 is placed and fixed to the mounting surface. The beamsplitter supporting assembly 1021 and the base 100 may be formed as an integrated structure or fixedly connected with each other to ensure accuracy of the positioning. The connection between the beamsplitter 1022 and the beamsplitter support assembly 1021 may be a snap connection, a screw connection, an adhesive connection, or any combinations thereof. Additionally, the material of the beamsplitter supporting assembly 1021 may be the same as or different from the material of the base 100.

The beam splitting assembly 102 may further include a secondary beamsplitter 1023 and a pressing block 1024. The secondary beamsplitter 1023 may be placed between the beamsplitter 1022 and the collimating assembly 105 and configured to partially filter out the outgoing light signal. For example, the secondary beamsplitter 1023 may be a polarization beam splitter (PBS) to filter out the S-polarized laser beam. Adding the secondary beamsplitter 1023 in the beam splitting assembly 102 can reduce the intensity of the outgoing signal light passing through to the beamsplitter 1022, thereby reducing local heating. Since the secondary beamsplitter 1023 filters out the S polarized light, the S-polarized light is directed away from the receiving assembly 103, and undesired effects caused by the S-polarized light to the receiving assembly 103 are minimized. Certainly, one of ordinary skill in the art would understand that without the secondary beamsplitter 1023, the optical transceiver component 10 may still emit and receive the laser beam and reach its design requirements of signal detection. However, having the secondary beam splitter 1023 may eliminate the effects of the S-polarized light signal to the receiving assembly 103 and improve the detection performance and detection accuracy of the optical transceiver component 10.

The secondary beamsplitter 1023 may be fixed by the beamsplitter supporting assembly 1021. The beamsplitter supporting assembly 1021 may be provided with an installation position of the secondary beamsplitter 1023. The secondary beamsplitter 1023 may be set in the beamsplitter supporting assembly 1021 at a preset inclination angle and position through the secondary beamsplitter mounting position, and fixed by the pressing block 1024.

The optical transceiver component 10 may further include a collimating assembly 105 as shown in FIG. 4 according to a further embodiment. The collimating assembly 105 may be disposed between the emitting assembly 101 and the beam splitting assembly 102. Therefore, after the outgoing light signal is emitted by the emission assembly 101, the collimating assembly 105 may collimate the outgoing light signal and direct it to the beam splitting assembly 102.

The collimating assembly 105 may include at one fast axis collimating lens, at least one slow axis collimating lens, a fast axis collimator barrel 1051, and a slow axis collimator holder 1052. The at least one fast axis collimating lens may be placed in the fast axis collimator barrel 1051, which is fixed on the base 100. The at least one slow axis collimating lens may be placed in the slow axis collimator holder 1052, which is also fixed on the base 100 next to and aligned with the fast axis collimator barrel 1051.

During installation, the fast axis collimator barrel 1051 is first installed on the base 100. The fast axis collimating lens is fixed in the fast collimator barrel 1051. Then the slow axis collimator holder 1052 is placed on the base 100. After the slow axis collimating lens is aligned with the fast axis collimating lens, the slow axis collimator holder 1052 may be fixed on the base 100.

The connection between the fast axis collimator barrel 1051 and the base 100 may be a snap connection, a screw connection, a connection through pin(s), an adhesive connection, or any combination thereof. The connection between the slow axis collimator holder 1052 and the base 100 may be a snap connection, a screw connection, a connection through pin(s), an adhesive connection, or any combinations thereof.

The emitting assembly 101 may include an emission board 1011 and an emission board supporting assembly. The emission board 1011 may include a laser generator and may be fixed to the emission board supporting assembly. The emitting board supporting assembly may further include an emission board adjustment cover 1013 and an emission board adjustment base 1012, respectively mounted on the base 100 and facing each other. The emission board 1011 may be sandwiched between the emission board adjustment cover 1013 and the emission board adjustment base 1012.

When installing the emitting assembly 101, the emission board 1011 may first be placed between the emission board adjustment cover 1013 and the emission board adjustment base 1012, and then the emission board adjustment cover 1013 is fixed to the emission board adjustment base 1012, so that the emission board 1011 is clamped between the emission board adjustment cover 1013 and the emission board adjustment base 1012. Then the clamped emission board 1011 may be placed in an emission board mounting position on the base 100. After the emission board 1011 is aligned with the beam splitting assembly 102, the emission board adjustment base 1012 may be fixed on the base 100.

In addition, the connection between the emission board adjustment base 1012 and the base 100 may be a snap connection, a screw connection, a connection through pin(s), an adhesive connection, or any combinations thereof.

The reflector assembly 104 may include a reflector supporting assembly 1041 and one or more reflector 1043 as shown in FIGS. 4 and 5. The reflector 1043 may be a flat mirror, a cylindrical mirror, an aspheric curvature mirror, or the like. The reflector 1043 may be fixed by the reflector supporting assembly 1041. Additionally, the reflector assembly 104 may further include a mirror cover 1042. The reflector 1043 may be fixed on an inner surface of the mirror cover 1042. The mirror cover 1042 may be fixedly connected to the reflector supporting assembly 1041, so as to fix the reflector 1043 within the reflector assembly 104.

When installing the reflector assembly 104, one may adjust the reflector assembly 104 until the reflector support assembly 1041 and the beamsplitter supporting assembly 1021 are aligned. Then the reflector assembly 104 may be fixedly connected to the beam splitting assembly 102.

The connection between the reflector assembly 104 and the beam splitting assembly 102 may be a snap connection, a screw connection, a connection through pin(s), an adhesive connection, and any combinations thereof. The connection between the mirror cover 1042 and the reflector supporting assembly 1041 may be a snap connection, a screw connection, a connection through pin(s), an adhesive connection, and any combinations thereof.

The receiving assembly 103 may include a receiving board (not shown in the figure), a receiving board base 1031, and a focusing assembly 106 as shown in FIG. 4. The receiving board may be used to obtain the reflected light signal. The receiving board may include a detector, such as an APD, an APD array, a MPPC, a SPAD, a PMT, a SIPM, or other detectors. The receiving board may be fixed by the receiving board base 1031. Alternatively, the focusing assembly 106 may be a separate assembly from the receiving assembly 103.

The focusing assembly 106 may be coupled to the reflector assembly 104 and configured to converge the reflected light signal form the reflector assembly 104. Then the reflected light signal may be directed by the focusing assembly 106 toward the detector of the receiving board in the receiving assembly 103. The focusing assembly 106 may include a focusing lens barrel 1061 and at least one focusing lens (not shown in the figure). The at least one focusing lens may be placed in the focusing lens barrel 1061. One end (i.e., "the first end") of the focusing lens barrel 1061 may be aligned with a light exit port of the reflector assembly 104, and the other end (i.e., "the second end") of the focusing lens barrel 1061 may be aligned with a light input port of the receiving assembly 103.

During Installation of the receiving assembly 103, a laser beam may be first emitted into the first end of the focusing lens barrel 1061 to adjust the positions of the receiving board and the receiving board base 1031. After the laser beam passes through the focusing assembly 106 and converges at the surface of the detector, the receiving board base 1031 and the focusing assembly 106 may be fixedly connected. The position of the focusing lens barrel 1061 may be adjusted thereafter. When the first end of the focusing lens barrel 1061 is aligned with the light exit port of the reflector assembly 104, the focusing assembly 106 and the reflector assembly 104 may be fixedly connected. That is, the receiving module 103 may be fixedly connected to the reflector supporting assembly 1041. The connection between the reflector assembly 104 and the focusing assembly 106 and the connection between the receiving board and the focusing assembly 106 may be snap connections, screw connections, connections through pin(s), adhesive connections, or any combinations thereof.

As described above, the reflector assembly 104 may be disposed between the beam splitting assembly 102 and the receiving assembly 103 according to an embodiment. According to an alternative embodiment, the reflector assembly 104 may also be disposed between the emitting assembly 101 and the beam splitting assembly 102.

Figure 6:
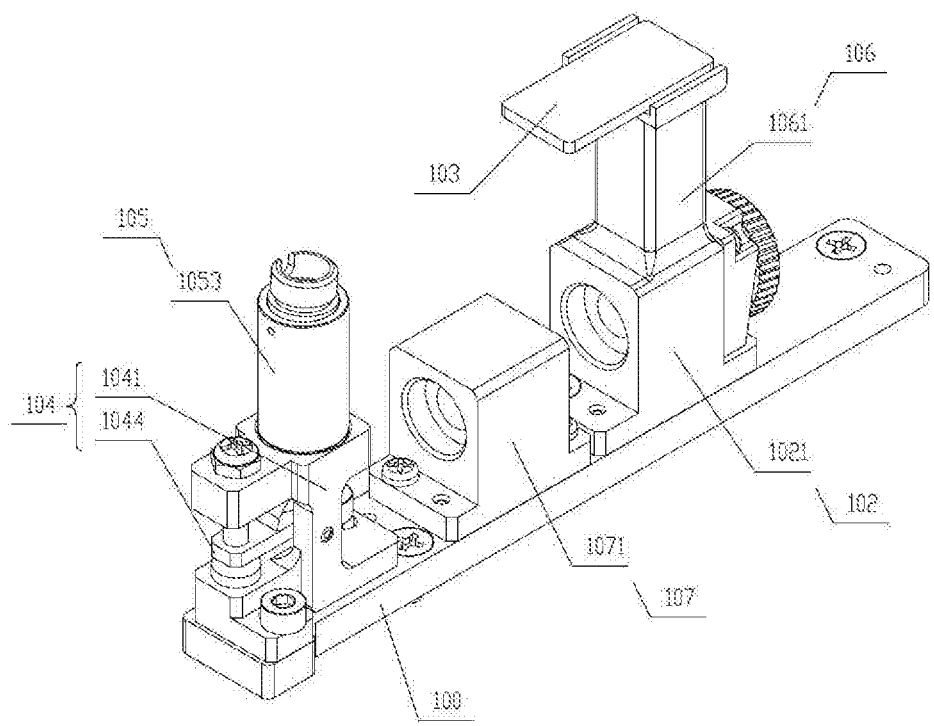
FIG. 6 is a schematic structural diagram of another Lidar's optical transceiver component according to some embodiments of the present application.

FIG. 6 is a schematic structural diagram of another optical transceiver component 10 according to some embodiments of the present application. The optical transceiver component 10 may include a base 100, a collimating assembly 105, a reflector assembly 104, a beam splitting assembly 102, a secondary beam splitting assembly 107, a focusing assembly 106, and a receiving assembly 103.

The optical transceiver component 10 shown in FIG. 6 has a different structural arrangement from the optical transceiver component 10 shown in FIG. 4, where the emitting assembly 101, the collimating assembly 105, and the beam splitting assembly 102 are all mounted on the base 100 and aligned with one another. In the optical transceiver component 10 shown in FIG. 6, the reflector assembly 104, the secondary beam splitting assembly 107, and the beam splitting assembly 102 may be mounted on the base 100. The collimating assembly 105 may be connected to the emitting assembly 101 at its top end, to the reflector assembly 104 at its bottom end. As a result, the collimating assembly 105 may be oriented towards the base 100. For example, the light axis of the collimating assembly 105 may be perpendicular or substantially perpendicular with respect to the base 100. The emitting assembly 101 may include an optical fiber for introducing a laser beam to the optical transceiver component 10.

In addition, the focusing assembly 106 may be connected to the beam splitting assembly 106 and oriented towards the base 100. For example, the light axis of the focusing assembly 106 may be perpendicular or substantially perpendicular with respect to the base 100. Consequently, the outgoing light signal may be emitted from the emitting assembly 101, directed downwardly to the collimating assembly 105, and then be reflected by the reflector assembly 104 towards right, and be transmitted all the way through the secondary beam splitting assembly 107 and the beam splitting assembly 102 to the detection region. The outgoing light signal is then reflected, at least in part, by a target object in the detection region. The reflected light signal from the detection region may be received by the beam splitting assembly 102, deflected or directed upwards by the beam splitting assembly 102 to the receiving assembly 103 through the focusing assembly 106. Accordingly, the light path of the optical transceiver component shown in FIG. 6 may be of a U shape.

The base 100 may be a mounting base of the optical transceiver component 10. At least one optical transceiver component 10 is fixed on the base 100 according to an installation angle as described above. Each optical transceiver component 10 may be installed on the base 100 and have a light transmission direction corresponding the installation angle. In addition, the material and shape of the base 100 may be determined according to actual use, which is not limited in this application.

The beam splitting assembly 102 may include a beamsplitter supporting assembly 1021 and a beam splitter 1022, which are similar to those of FIG. 4.

Different from the embodiment of FIG. 4, however, the optical transceiver component 10 of FIG. 6 may further include a secondary beam splitting assembly 107, which is a separate assembly from the beam splitting assembly 102. The secondary beam splitting assembly 107 may be placed between the reflector assembly 104 and the beam splitting assembly 102. The secondary beam splitting assembly 107 may include a secondary beamsplitter supporting assembly 1071 and a secondary beamsplitter (not shown in FIG. 6). The secondary beamsplitter supporting assembly 1071 may be a cubic structure (e.g., a cubic housing). The secondary beam splitting supporting assembly 1071 may include a secondary beamsplitter mounting position to fix the secondary beamsplitter at a preset tilt angle and position. Accordingly, when installed, the secondary beamsplitter may be placed and mounted to the correspondingly secondary beamsplitter supporting assembly 1071. The secondary beamsplitter supporting assembly 1071 may be fixedly connected to the base 100. The features and functions of the secondary beam splitting assembly 107 are otherwise similar to those of secondary beamsplitter 1023.

The reflector assembly 104 may include a reflector 1043, a reflector supporting assembly 1041, and an adjusting member 1044. The reflector 1043 may be mounted on the reflector supporting assembly 1041. The adjusting member 1044 may be configured to adjust the position and angle of the reflector 1043. The reflector 1043 may be fixed on the base 100 through the reflector supporting assembly 1041. In addition, the connection between the reflector supporting assembly 1041 and the base 100 may be a snap connection, a screw connection, a connection through pin(s), an adhesive connection, and any combinations thereof.

Additionally, the receiving assembly 103 may further include the focusing assembly 106. The focusing assembly 106 may be placed between a receiving board (not shown in FIG. 6) of the receiving assembly 103 and the beam splitting assembly 102. The reflected light signal from the beam splitting assembly 102 may be converged and directed by the focusing assembly toward the receiving board of the receiving assembly 103. The focusing assembly 106 may include a focusing lens barrel 1061 and at least one focusing lens (not shown) in the focusing lens barrel 1061. One end (i.e., "the first end") of the focusing lens barrel 1061 may be connected to and aligned with the light exit port of the beam splitting assembly 102, and the other end (i.e., "the second end") may be connected to and aligned with the light input port of the receiving assembly 103.

The optical transceiver component 10 may further include a collimating assembly 105 as shown in FIG. 6. The collimating assembly 105 may be placed between the emitting assembly 101 and the reflector assembly 104. The outgoing light signal emitted by the incident optical fiber can be collimated through the collimating assembly 105 and then emitted to the reflector assembly 104. Specifically, the collimating assembly 105 may include a collimating lens barrel 1053 and at least one collimating lens (not shown in FIG. 6) in the collimating lens barrel 1053. The incident fiber may be aligned with the light input port of the collimator lens barrel 1053. The light exit port of the collimating lens barrel 1053 may be aligned with the light input port of the reflector assembly 104. The collimating lens barrel may be fixed on a reflector supporting component, and the outgoing light signal may be directed to the reflector assembly 104 after passing through the collimating assembly 105.

To install the optical transceiver component in FIG. 6, the receiving assembly 103 may first be aligned with the beam splitting assembly 102, and then be fixedly connected to the beam splitting assembly 102. The beam splitting assembly 102 may then be aligned with the reflector assembly 104. The beam splitting assembly 102 and the reflector assembly 104 may be fixed to the base 100. Then, the emitting assembly 101 may be fixedly connected to the reflector assembly 104. If the optical transceiver component 10 includes the collimating assembly 105, the emitting assembly 101 may first be connected to the collimating assembly 105, which may then be connected and fixed to the reflector assembly 104.

Finally, the receiving assembly 103 may be aligned with and fixedly connected to the beam splitting assembly 102. Here, the reflector assembly 104 may first be aligned with the beam splitting assembly 102 before the reflector assembly 104 and the beam splitting assembly 102 are fixedly connected on the base 100. In other words, one have to make sure that the outgoing light signal emitted by the emitting assembly 101 is reflected by the reflector assembly 104 and directed to the beam splitting assembly 102 before fixing the reflector assembly 104 and the beam splitting assembly 102. In addition, the connection between the reflector assembly 104 and the base 100 and the connection between the beam splitting assembly 102 and the base 100 may be snap connections, screw connections, connections through pin(s), adhesive connections, and any combinations thereof.

Figure 7:
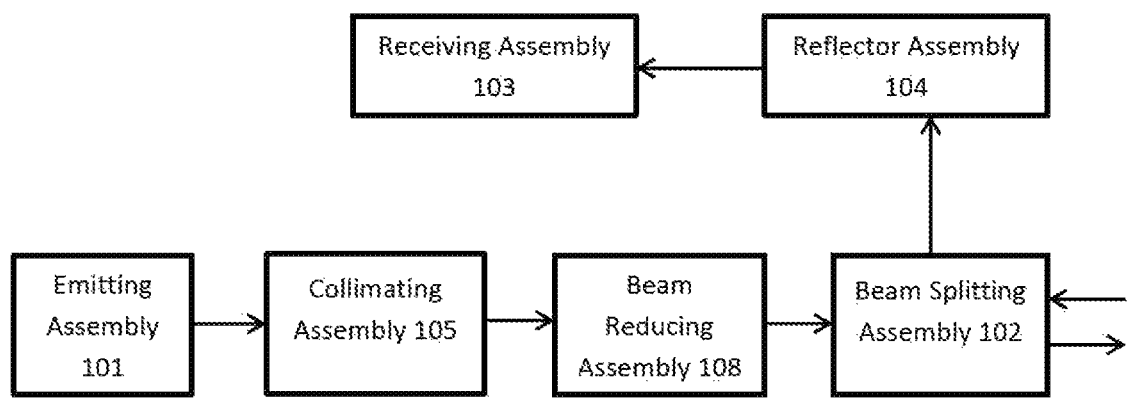
FIG. 7 is a schematic diagram of a Lidar's optical transceiver component according to some embodiments of the present application.

FIG. 7 is a schematic diagram of another optical transceiver component 10 according to some embodiments of the present application. In addition to the elements shown in FIG. 3, the optical transceiver component 10 in FIG. 7 may further includes at least one beam reducing assembly 108 and collimating assembly 105.

The at least one beam reducing assembly 108 may be disposed between the emitting assembly 101 and the beam splitting assembly 102. The beam reducing assembly 108 may be configured to reduce the size (beam diameter) of the outgoing light signal along a direction perpendicular to the transmission direction of the outgoing light signal. Reducing the beam diameter while keeping the overall power of the outgoing light signal, may increase the energy density of the outgoing light signal, thereby improving the emitting efficiency of the outgoing light signal and improving the detection distance and detection performance of the optical transceiver component 10.

The collimating assembly 105 of FIG. 7 may be disposed between the emitting assembly 101 and the beam reducing assembly 108. The outgoing light signal from the emitting assembly 101 may first be collimated by the collimating assembly 105, and then may pass through the beam splitting assembly 102 and emitted to the target region, where the target object locates. The outgoing light signal is then reflected by the target object and becomes the reflected light signal, which travels back to the beam splitting assembly 102. The reflected light signal may be received by the receiving assembly 103 after being deflected and directed by the beam splitting assembly 102. The collimating assembly 105 may include a negative lens, such as a concave lens, which may cause a beam of parallel rays to diverge after refraction. The negative lens may diverge the outgoing light signal in the direction of the slow axis and/or the fast axis, occupying a small space distance, and increasing the focal length of the outgoing light signal in the slow axis and/or the fast axis direction, reducing the diversion angle of the outgoing light signal (i.e., converging the outgoing light signal), which is equivalent to increasing the energy density of the outgoing light signal, and thereby improving detection distance and detection effect of the optical transceiver component.

Figure 8:
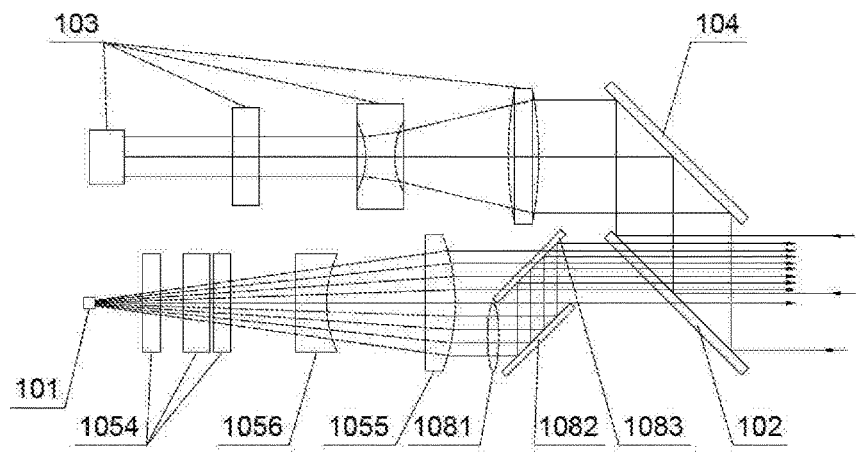
FIG. 8 is a schematic diagram of an optical structure of a Lidar's optical transceiver component according to some embodiments of the present application.
Figure 9:
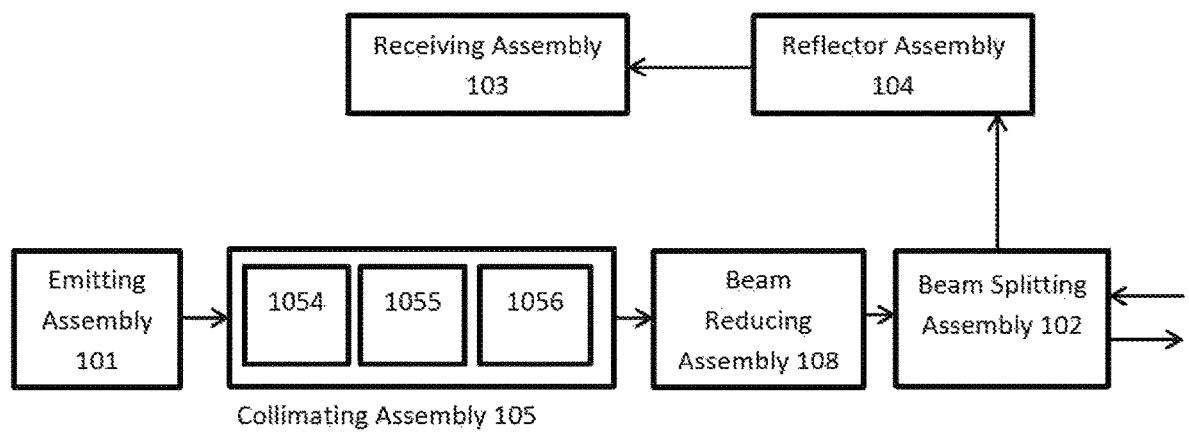
FIG. 9 is a schematic diagram of a Lidar's optical transceiver component according to some embodiments of the present application.

FIG. 8 is a schematic diagram of an optical structure of the optical transceiver component 10 according to some embodiments of the present application. FIG. 9 is a schematic diagram of the optical transceiver component 10 corresponding to FIG. 8.

As shown in FIG. 8, the beam reducing assembly 108 may include a half-wave plate 1081, a reflector 1082, and a polarizing beamsplitter 1083. The half-wave plate 1081 may convert P-polarized light to S-polarized light, or convert S-polarized light to P-polarized light. The polarizing beamsplitter 1083 may let the P-polarized light pass through and deflect the S-polarized light. Alternatively, the polarizing beamsplitter 1083 may let the S-polarized light pass through and deflect the P-polarized light. The outgoing light signal may Include a first portion (i.e., "the first outgoing light signal") and a second portion (i.e., "the second outgoing light signal"). The first outgoing light signal may pass through the polarizing beamsplitter 1083 and continue towards the beam splitting assembly 102. The second outgoing light signal passes through the half-wave plate 1081 and may be directed by the reflector 1082 towards the polarizing beamsplitter 1083. The polarizing beamsplitter 1083 may then directed the second outgoing light signal towards the beam splitting assembly 102. The optical axis of the first outgoing light signal may be parallel to the optical axis of the second outgoing light signal after the beam reducing assembly 108.

The polarizing beamsplitter 1083 and half-wave plate 1081 may be aligned along the fast axis direction of the outgoing light signal. The outgoing light signal may be P-polarized light, S-polarized light, or a mixture of P-polarized light and S-polarized light. The following description takes the P-polarized outgoing light signal as an example for illustration. In this example, the polarizing beamsplitter 1083 lets the P-polarized light pass and deflects the S-polarized light. Thus, when the outgoing light signal includes only P-polarized light, the first outgoing light signal passes through the polarizing beamsplitter 1083 and transmits towards the beam splitting assembly 102. The second outgoing light signal passes through the half-wave plate 1081 and is converted into S-polarized light. The second outgoing light is then directed by the reflector 1082 toward the polarizing beamsplitter 1083. The polarizing beamsplitter 1083 then reflect the second outgoing light towards the beam splitting assembly 102. As a result, the second outgoing light signal at least partially overlaps with the first outgoing light signal when exiting from the beam reducing assembly 108. Further, the first outgoing light signal and the second outgoing light signal have no excess energy loss, assuming the efficiency of the beam reducing assembly 108 is 1. The outgoing light signal passing through the beam reducing assembly 108 has a reduced beam diameter in the fast axis direction without loss of energy. The beam reducing assembly 108 increases the energy density of the outgoing light signal, thereby improving the emitting efficiency of the outgoing light signal and the detection distance and detection effect of the optical transceiver component 10.

It should be noted that the polarizing beamsplitter 1083 and half-wave plate 1081 may be arranged in any direction on a plane perpendicular to the transmission direction of the outgoing light signal. The outgoing light signal passing through the beam reducing assembly 108 reduces the beam diameter in the corresponding direction. When the outgoing light signal includes only S-polarized light, the polarizing beamsplitter 1083 may be adjusted so that the S-polarized light passes through and the P-polarized light is reflected. When the outgoing light signal includes only P-polarized light, the polarizing beamsplitter 1083 may be adjusted so that the P-polarized light passes through and the S-polarized light is reflected. When the outgoing light signal includes a mixed light of P-polarized light and S-polarized light, the beam reducing assembly 108 passes and reduces the beam diameter of the P-polarized portion or S-polarized portion only depending on the configuration of the beam reducing assembly 108. Taking the foregoing embodiment as an example, the P-polarized light in the first outgoing light signal passes through the polarizing beamsplitter 1083. The S-polarized light in the first outgoing light signal is reflected by the polarizing beamsplitter 1083. The S-polarized light in the second outgoing light signal is converted into P-polarized light by half-wave plate 1081 and reflected by the reflector 1082 to the polarizing beamsplitter 1083. Because the polarizing beamsplitter 1083 is configured to pass through P-polarized light, the P-polarized light in the second outgoing light from the half-wave plate 1081 passes through the polarizing beamsplitter 1083 and is not directed towards the beam splitting assembly 102. Thus, the S-polarized light in the outgoing light signal cannot pass through beam reducing assembly 108. Accordingly, the energy loss is large, and the energy utilization rate is low. At the same time, the S-polarized light in the outgoing light signal may be reflected multiple times inside the optical transceiver component 10. This may increase the stray light, which may affect the detection performance of the receiving assembly.

According to an embodiment, the polarizing beamsplitter 1083 and half-wave plate 1081 may be arranged along a fast axis direction or a slow axis direction of the outgoing light signal. Thus, the diameters of the first outgoing light signal and the second outgoing light signal along the fast axis direction or the slow axis direction may each be % a of the diameter of the outgoing light signal. The central optical axis of the first outgoing light signal may coincide with the central optical axis of the second outgoing light signal after passing through the beam reducing assembly 108.

Taking the foregoing embodiment as an example, the diameter of the first outgoing light signal and the diameter of the second outgoing light signal along the fast axis direction may be ½ of the diameter of the outgoing light signal. The polarizing beamsplitter 1083 and half-wave plate 1081 may be aligned along the fast axis direction of the outgoing light signal. That is, half of the outgoing light signal along the direction of the fast axis is the first outgoing light signal, and the other half is the second outgoing light signal. When the first outgoing light signal passes through the polarizing beamsplitter 1083, its beam diameter is unchanged. When the second outgoing light signal passes through the half-wave plate 1081, the reflector 1082, and the polarizing beamsplitter 1083, its beam diameter does not change as well. In addition, when the second outgoing light signal is emitted from the beam reducing assembly 108, the central optical axis of the second outgoing light signal is shifted upwardly along the fast axis direction by a distance of ½ of the diameter of the outgoing light signal. Accordingly, the central optical axis of the first outgoing light signal coincide with the central optical axis of the second outgoing light signal when they are output from the beam reducing assembly 108.

According to this embodiment, after the outgoing light signal passes through the beam reducing assembly 108, its beam diameter is reduced by half in the direction of the fast axis. As a result, the energy density of the outgoing light signal is increased, and the emission efficiency of the outgoing light signal is improved. Therefore, with the above-design, the beam reducing assembly 108 may have a desired compression effect on the beam diameter of the outgoing light signal, and a desired energy efficiency. Further, because the beam diameter of the first outgoing light signal in a direction of the fast axis and the beam diameter of the second outgoing light signal in a direction of the fast axis is ½ of the diameter of the outgoing light signal, the central optical axis of the first outgoing light signal and the central optical axis of the second outgoing light signal coincide with each other, the energy density distribution of the outgoing light signal after the beam reducing assembly 108 is uniform, which is beneficial to accurate detection of the target object.

It should be noted that when the polarizing beamsplitter 1083 and half-wave plate 1081 are arranged along the fast axis direction of the outgoing light signal, both the first outgoing light signal and the second outgoing light signal may have a diameter that is ½ of the diameter of the outgoing light signal along the fast axis direction. When the polarizing beamsplitter 1083 and half-wave plate 1081 are arranged along the slow axis of the outgoing light signal, both the first outgoing light signal and the second outgoing light signal may have a diameter that is ½ of the diameter of the outgoing light signal along the slow axis. Accordingly, the beam reducing assembly 108 may compress the beam diameter of the outgoing light signal by half in the direction of the fast axis, the slow axis, or both.

According to an embodiment, the projections of the polarizing beamsplitter 1083 and the half-wave plate 1081 on a plane perpendicular to the transmission direction of the outgoing light signal may not intersect. Otherwise, part of the light beam in the outgoing light signal would pass through half-wave plate 1081 and then reach the polarizing beamsplitter 1083 shown in FIG. 8. As a result, the part of the light beam in the outgoing light signal would be reflected by the polarizing beamsplitter 1083, resulting in waste of energy. Taking the foregoing embodiment as an example, assuming that the outgoing light signal includes only P-polarized light, when the projections of the polarizing beamsplitter 1083 and half-wave plate 1081 on a plane perpendicular to the transmission direction the outgoing light signal intersects, the P-polarized light passes through the half-Wave plate 1081 is converted to S-polarized light, a portion of which is directed toward the polarizing beamsplitter 1083 and is deflected upwardly by the polarizing beamsplitter 1083. Thus, this portion of the outgoing light signal cannot exit the beam reducing assembly 108, resulting in a waste of the energy. Therefore, the projections of the polarizing beamsplitter 1083 and half-wave plate 1081 on a plane perpendicular to the transmission direction of the outgoing light signal cannot intersect.

The beam splitting assembly 102 may be a beamsplitter, a polarization beam splitter, a polarization beam splitting prism, or the like. Specifically, the beam splitting assembly 102 may include a reflector as shown in FIG. 8. The reflector of the beam splitting assembly 102 may have an opening for light transmission (i.e., "the light transmitting hole"). The light transmitting hole may correspond to the outgoing light signal that passes through the beam reducing assembly 108. After the outgoing light signal passes through the beam reducing assembly 108, the outgoing light signal further passes through the reflector of the beam splitting assembly 102 and exits from the light transmitting hole thereon. Since the beam diameter of the outgoing light signal after the beam reducing assembly 108 may be reduced, the diameter of the light transmitting hole on the reflector of the beam splitting assembly 102 can be reduced accordingly as long as the outgoing light signal is not blocked. When the reflected light signal returns coaxially, the reflected light signal may be reflected by the reflector of the beam splitting assembly 102 to the receiving assembly 103. Because the diameter of the light transmission hole opened on the reflector of the beam splitting assembly 102 is reduced due to the reduced diameter of the outgoing light signal, more reflected light signal may be directed by the reflector to the receiving assembly 103. Accordingly, the detection distance and detection effect of the optical transceiver component 10 may be improved.

Referring to FIG. 8 and FIG. 9, the optical transceiver component 10 may include a collimating assembly 105. The collimating assembly 105 may include a fast-axis-collimating lens group 1054, a slow-axis-collimating lens group 1055, and a negative lens group 1056. The fast-axis-collimating lens group 1054 may collimate the outgoing light signal in the direction of the fast axis. The slow-axis-collimating lens group 1055 may collimate the outgoing light signal in the direction of the slow axis. The negative lens group 1056 may diverge the outgoing light signal in a slow axis direction and/or a fast axis direction, so as to render the outgoing light signal occupying a small space distance, to increase the focal length of the outgoing light signal in the slow axis and/or the fast axis direction, to reduce the diversion angle of the outgoing light signal, and to converge the outgoing light signal, which is equivalent to increasing the energy density of the outgoing light signal, and thereby improving detection distance and detection effect of the optical transceiver component.

As shown in FIG. 8, the negative lens group 1056 may be a negative cylindrical lens group. The negative cylindrical lens group may be set on the incident side of the slow-axis-collimating lens group 1055, and the generatrix(es) of the negative cylindrical lens group are set along the slow axis direction. First, when the outgoing light signal passes through the negative cylindrical lens group, it is diverged in the direction of the slow axis. Then the outgoing light signal is collimated by the slow-axis-collimating lens group 1055, which increases the focal length of the outgoing light signal in the slow axis direction. Since the product of the diversion angle and focal length of the outgoing light signal is a fixed value, which is determined by the type and characteristics of the laser generator, assuming the space occupied by the light does not increase, if the focal length of the outgoing light signal in the slow axis direction increases, the diffusion angle of the outgoing light signal decreases and the outgoing light signal converges. Therefore, the optical structure shown in FIG. 8 improves the output energy density of the outgoing light signal, thereby improving the detection distance and detection effect of the optical transceiver component 10. Further, the negative cylindrical lens group includes a concave cylindrical lens. The slow-axis-collimating lens group 1055 includes a convex cylindrical lens. This design achieves the effect of increasing the focal length while using fewer optical lenses, thereby reducing the difficulty of assembly and adjustment.

In some embodiments, the negative cylindrical lens group may also be disposed on the incident side of the fast axis collimating lens group 1054, and the generatrix(es) of the negative cylindrical lens group are disposed along a fast axis direction. First, the outgoing light signal may be diverged in the fast axis direction through the negative cylindrical lens group. Then, the outgoing light signal may be collimated by the fast-axis-collimating lens group 1054 to increase the focal length of the outgoing light signal in the fast axis direction. Since the diversion angle of the outgoing light signal in the fast axis direction decreases, the outgoing light signal converges. Therefore, this design improves the output energy density of the outgoing light signal, and improves the detection distance and detection effect. Further, the negative cylindrical lens group may include a concave cylindrical lens. The fast-axis-collimating lens group 1054 may include a convex lens. This design achieves the effect of increasing the focal length while using fewer optical lenses, thereby reducing the difficulty of assembly and adjustment.

Of course, the negative lens group 1056 may also diverge the outgoing light signal in the fast axis direction and the slow axis direction at the same time. The negative lens group 1056 may be disposed on the incident side of the fast axis collimator lens, and the generatrix(es) of the negative cylindrical lens group is(are) disposed along the fast axis direction. First, the outgoing light signal may diverge in the fast axis direction through the negative cylindrical lens group, and then may be collimated through the fast-axis-collimating lens group 1054 and the slow-axis-collimating lens group 1055, respectively, thereby Increasing the focal length of the outgoing light signal in the fast axis direction and the slow axis direction. This causes the conversion angle of the outgoing light signal to decrease in both the fast axis direction and the slow axis direction. As a result, the outgoing light signal converges. Therefore, this design improves the output energy density of the outgoing light signal, and improves the detection distance and detection effect.

It should be noted that, the negative lens group 1056 may increase the focal length of the outgoing light signal only in the fast axis direction, only in the slow axis direction, or in the fast axis and the slow axis directions together. Since the diversion angle of the outgoing light signal in the direction of the fast axis is smaller than the diversion angle of the outgoing light signal in the direction of the slow axis, in order to reduce the cost of the device, the above-described focal length increase and diversion angle reduction may only be applied to the slow axis.

Referring to FIG. 8, the negative lens group 1056 of the collimating assembly 105 may cause the outgoing light signal diverge in the slow axis direction and/or the fast axis direction. Therefore, the outgoing light signal may occupy a small space, and have an increased focal length and decreased diversion angle in the slow axis direction and/or the fast axis direction. Therefore, the negative lens group 1056 may converge the outgoing light signal. This design may increase the energy density of the outgoing light signal, and improve the detection distance and detection effect of the optical transceiver component. Then, when the outgoing light signal passes through the beam reducing assembly 108, the beam diameter of the outgoing light signal may decrease in at least one direction. Therefore, the outgoing energy density of the outgoing light signal is increased, the emitting efficiency of the outgoing light signal is improved, and the detection distance and detection effect are improved.

Figure 10:
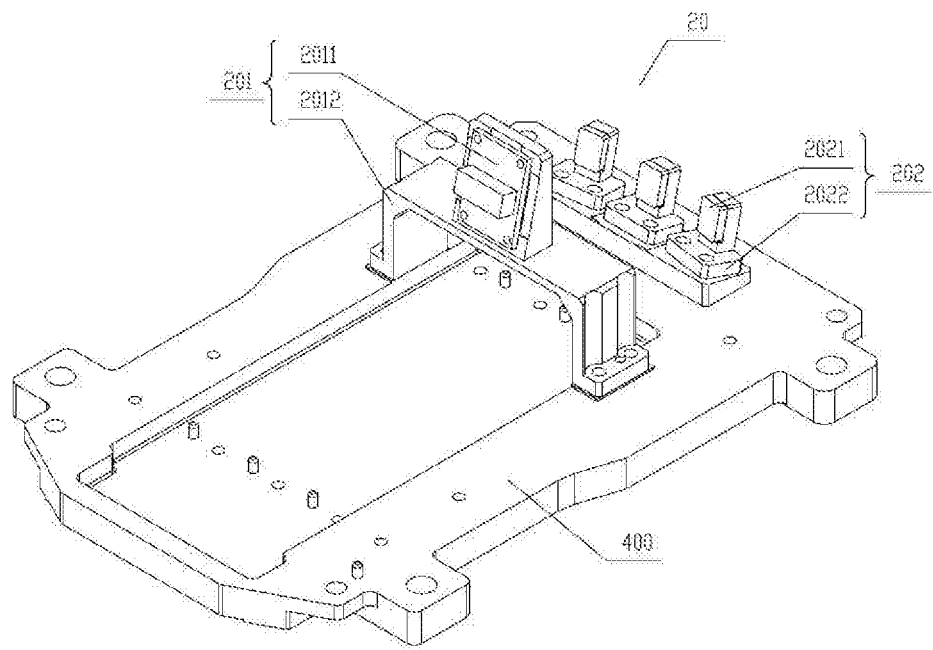
FIG. 10 is a schematic structural diagram of a base plate and a scanning component of a Lidar according to some embodiments of the present application.
Figure 11:
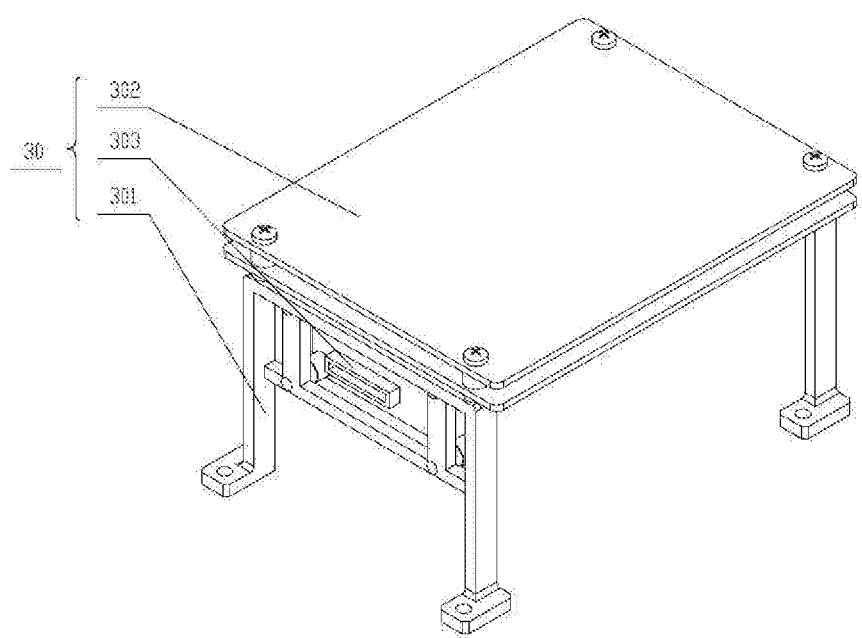
FIG. 11 is a schematic structural diagram of a hardware component of a Lidar according to some embodiments of the present application.

In some embodiments, the Lidar 1 may include multiple optical transceiver components 10. The Lidar 1 may also include a housing component, a hardware component 30, and a scanning component 20. The housing component includes a cover and a bottom plate 400. FIG. 10 is a schematic structural diagram of a base plate and a scanning component 20 of the Lidar 1 according to some embodiments of the present application. FIG. 11 is a schematic structural diagram of a hardware component 30 of the Lidar 1 according to some embodiments of the present application.

As shown in FIG. 10 and FIG. 11, the optical transceiver components 10, the hardware component 30, and the scanning component 20 are all disposed in a cavity enclosed by the cover (not shown) and the bottom plate 400.

The hardware component 30 includes a base board 302, a control board 303, and a bracket 301. The bracket 301 includes a platform and a plurality of legs. The plurality of legs are evenly disposed below the platform to support the entire platform. The lower ends of the legs are fixedly connected to the bottom plate 400. Both the base board 302 and the control board 303 are fixed on the bracket 301.

The scanning component 20 includes a galvanometer assembly 201 and a reflector assembly 202. The galvanometer assembly 201 includes a galvanometer 2011 and a galvanometer support component 2012. The galvanometer 2011 is fixed on the bottom plate 400 through the galvanometer support component 2012. The reflector assembly 202 includes a plurality of reflectors 2021. The reflectors 2021 and the optical transceiver components 10 are disposed in a one-to-one correspondence. Each of the reflectors 2021 is fixedly connected to the bottom plate 400 through a reflector support component 2022.

An outgoing light signal of the optical transceiver component 10 is directed toward a corresponding reflector 2021; the outgoing light signal is reflected by reflector 2021 and directed toward the galvanometer 2011; the galvanometer 2011 directs the outgoing light signal to travel outward for scanning; a reflected light signal from a target object is received by the galvanometer 2011 and then directed toward the reflector 2021; the reflector 2021 reflects the reflected light signal toward a corresponding optical transceiver component 10; so the optical transceiver component 10 receives the reflected light signal.

When the field of view angle of a single optical transceiver component 10 cannot meet the requirements of use, the Lidar 1 may be provided with a plurality of optical transceiver components 10. A plurality of installation positions for the optical transceiver components 10 may be provided on the bottom plate 400. When the Lidar 1 is assembled, the field of view angle required by the Lidar 1 may be satisfied by splicing or combining the fields of view angle of the plurality of optical transceiver components 10.

Figure 12:
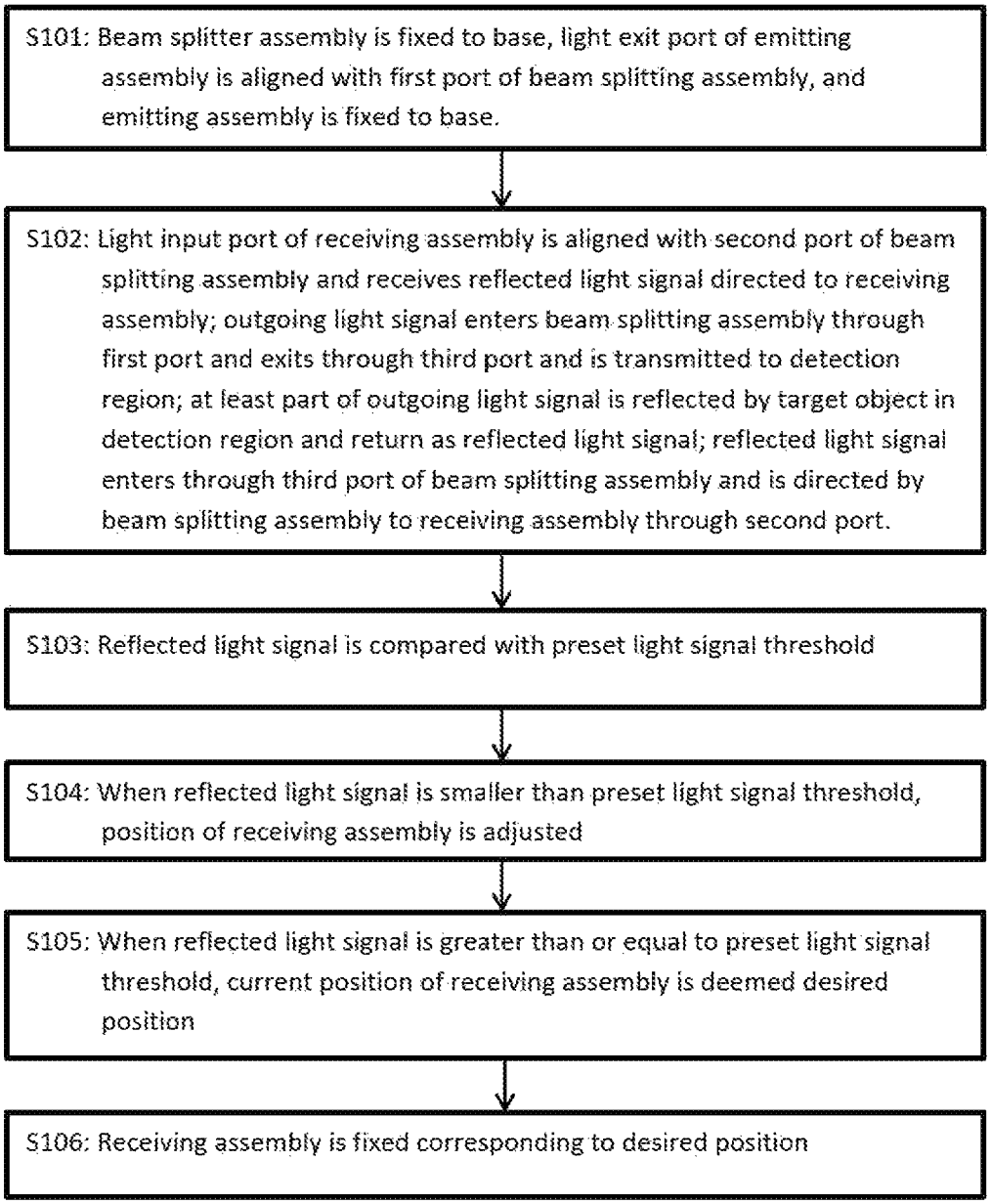
FIG. 12 is a Lidar adjustment method according to some embodiments of the present application.

FIG. 12 is a Lidar adjustment method according to some embodiments of the present application. The adjustment method shown in FIG. 12 may be applied in the embodiments shown in FIG. 2. The Lidar 1, to which the adjustment method may be applied, includes at least one optical transceiver component 10. The optical transceiver component 10 includes an emitting assembly 101, a beam splitting assembly 102, a receiving assembly 103, and a base 100 as described above. As shown in FIG. 12, the adjustment method may include the following steps:

S101, fixedly connecting the beam splitting assembly 102 and the base 100 to each other; aligning a light exit port of the emitting assembly 101 with a first port of the beam splitting assembly 102; and then fixedly mounting the emitting assembly 101 on the base 100.

Specifically, the beam splitting assembly 102 and the base 100 are an integrated structure or are fixedly connected to each other in a non-detachable manner. The light exit port of the emitting assembly 101 is aligned with the first port of the beam splitting assembly 102. The emitting assembly 101 may then be fixed on the base 100. The connection may be a snap connection, a screw connection, a connection through pin(s), an adhesive connection, or any combinations thereof.

S102, alighting the light input port of the receiving assembly 103 with the second port of the beam splitting assembly 102 to receive and direct the reflected light signal toward the receiving assembly 103. Specifically, the outgoing light signal emitted by the emitting assembly 101 enters the first port of the beam splitting assembly 102, exits from the third port of the beam splitting assembly 102, and travels to a detection region, where at least a part of the outgoing light signal is reflected by a target object. The reflected light signal then enters the third port of the beam splitting assembly 102. The reflected light signal is then deflected by the beam splitting assembly 102 and directed toward the receiving assembly 103.

In this case, before the adjustment of the Lidar 1, a known target object can be disposed in the detection region. The distance between the known target object and the Lidar 1 is known.

Specifically, the outgoing light signal emitted by the emitting assembly 101 enters the beam splitting assembly 102 via the first port thereof and exits from the third port thereof, and then travels to the detection region, where it is reflected by the target object located therein. The reflected light signal then enters the beam splitting assembly 102 via the third port thereof, exits via the second port thereof, and then travels toward the receiving assembly 103. A detector of the receiving assembly 103 is configured to receive the reflected light signal. The outgoing light signal and the reflected light signal between the beam splitting assembly 102 and the target object are coaxial.

S103, The reflected light signal obtained by the receiving assembly 103 is compared with a preset light signal threshold.

The preset optical signal threshold may be a preset voltage threshold or a preset current threshold. Specifically, after obtaining the reflected light signal, the detector of the receiving assembly 103 may convert the reflected light signal into a voltage signal or a current signal, which may be compared with a preset voltage signal threshold or a preset current signal threshold.

S104. When the reflected light signal is lower than the preset light signal threshold, adjust the position of the receiving assembly 103.

For example, the reflected light signal is converted to a voltage signal by the detector of the receiving assembly 103. If the voltage signal is lower than the preset voltage signal threshold, the position of the receiving assembly 103 is adjusted in the optical transceiver component 10.

S105, the position of the receiving assembly 103 is adjusted until the reflected light signal received by the receiving assembly 103 is greater than or equal to the preset light signal threshold. The current position of the receiving assembly 103 is marked, and the receiving assembly 103 is deemed property positioned in this current position.

In this position, the receiving assembly 103 generally has a good receiving effect. S106, the receiving assembly 103 may then be fixedly mounted on the beam splitting assembly 102 in the above-described position obtain in S105. Alternatively, the receiving assembly 103 may be fixedly mounted on the base 100 in the above-described position obtain in S105. The connection between the receiving assembly 103 and the beam splitting assembly 102, or the connection between the receiving assembly 103 and the base 100 may be a snap connection, a screw connection, a connection through pin(s), an adhesive connection, or any combinations thereof.

When the field of view angle of a single optical transceiver component 10 cannot meet the requirements, the Lidar 1 may be provided with a plurality of the optical transceiver components 10. The Lidar 1 may further include a bottom plate 400, a hardware component 30, a galvanometer assembly 201, and a reflector assembly 202, as shown in FIGS. 10 and 11. The adjustment method shown in FIG. 12 may further include the following steps (not shown in FIG. 12):

S107, the galvanometer assembly 201 is mounted on the bottom plate 400.

S108, at least one of the optical transceiver components 10 obtained in S101-S106 is placed in a mounting position on the bottom plate 400.

S109, at least one reflector assembly 202 is fixedly mounted on the bottom plate 400.

S110, the optical transceiver component 10 and the reflector assembly 202 is set one-to-one correspondingly. At least one of the position of the optical transceiver component 10 or the position of the corresponding reflector assembly 202 is adjusted, so that the outgoing light signal from the optical transceiver component 10 is aligned with the corresponding reflector assembly 202.

S111, the optical transceiver component 10 is fixedly mounted to the bottom plate 400.

S112, the hardware component 30 is fixedly mounted to the bottom plate 400.

S113, the cover and the bottom plate 400 are assembled after the internal adjustment is completed.

For the adjustment method provided in this embodiment, when detecting a target object, an outgoing light signal emitted by the emitting assembly 101 passes through the beam splitting assembly 102, and is directed to a detection region. The outgoing light signal is then reflected by the target object in the detection region. The reflected light signal is deflected by the beam splitting assembly 102 and then received by the receiving assembly 103. During a process of calibrating the Lidar 1, the beam splitting assembly 102 and the base 100 are integrated or fixedly connected together, the emitting assembly 101 and the receiving assembly 103 are mounted and aligned with respect to the beam splitting assembly 102. According to the position of the beam splitting assembly 102, the light exit port of the emitting assembly 101 is aligned with the first port of the beam splitting assembly 102 and fixed on the base 100. The light input port of the receiving assembly 103 is aligned with the second port of the beam splitting assembly 102. The reflected light signal is received by the receiving assembly 103. Then the reflected light signal is compared with the preset light signal threshold. When the reflected light signal is lower than the preset light signal threshold, the position of the receiving assembly 103 is adjusted. When the reflected light signal is greater than or equal to the preset light signal threshold, it is determined that the receiving assembly 103 is property positioned. The receiving assembly 103 is then fixedly installed according to the current position obtained above. The Lidar 1 includes at least one optical transceiver component 10. The emitting assembly 101, the beam splitting assembly 102, and the receiving assembly 103 of each optical transceiver component 10 may be adjusted before the assembling. After the optical transceiver component 10 is adjusted, it may be mounted on the bottom plate 400. In addition, there is also a scanning component 20 on the bottom plate 400. After being adjusted, both the optical transceiver component 10 and the scanning component 20 may be fixed to the bottom plate 400. Next, the hardware component 30 is fixed to the bottom plate 400 for internal adjustment. Finally, the cover and the bottom plate 400 are assembled and packaged to complete the entire installation and adjustment of the Lidar.

When the Lidar is assembled, the plurality of optical transceiver components 10 may be combined together to provide the field of view angle required by the Lidar. The installation and adjustment process is simple and fast. When the emitting assembly 101 or the receiving assembly 102 needs to be replaced for maintenance, only the damaged part thereof needs to be replaced and then a corresponding optical transceiver component is readjusted. Accordingly, the emitting assemblies 101 and the receiving assemblies 102 do not need to be re-adjusted. In this way, the product maintenance becomes easier and has a lower cost. In addition, each optical transceiver component 10 is individually adjusted, which ensures that the transmission and reception effects of each optical transceiver component 10 is good, and thus the detection effect of the Lidar 1 can be reliably guaranteed.

FIG. 13 is a Lidar adjustment method according to some embodiments of the present application. The adjustment method shown in FIG. 13 can be applied to the embodiment shown in FIG. 4. The Lidar 1, which may be adjusted according to this embodiment, includes at least one optical transceiver component 10. The optical transceiver component 10 includes an emitting assembly 101, a beam splitting assembly 102, a receiving assembly 103, a reflector assembly 104, a collimating assembly 105, and a base 100. The reflector assembly 104 is disposed between the beam splitting assembly 102 and the receiving assembly 103. As shown in FIG. 13, the adjustment method may include the following steps:

S201, fixing the beam splitting assembly 102 to the base 100 together, and aligning a light exit port of the emitting assembly 101 with a first port of the beam splitting assembly 102, and then fixing the emitting assembly 10 to the base 100.

Specifically, when the optical transceiver component 10 is being adjusted, the beam splitting assembly 102 and the base 100 are integrated or fixedly connected together. The light exit port of the emitting assembly 101 is aligned with the first port of the beam splitting assembly 102. The emitting assembly 101 may then be is fixed on the base 100. The connection therebetween may be a snap connection, a screw connection, a connection through pin(s), an adhesive connection, or any combinations thereof.

S2011, the beam splitting assembly 102 and the base 100 are integrated or fixedly connected together, a fast axis collimator is fixed to the base 100 through a fast axis collimator barrel 1051, and the fast axis collimator is disposed in the fast axis collimator barrel 1051.

S2012, an emission board 1011 is fixedly held by an emission board adjustment cover 1013 and an emission board adjustment base 1012, the fixedly held emission board 1011 is placed in an emission board mounting position on the base 100, and the position of the emitting assembly 101 is adjusted so that the outgoing light signal emitted by the emitting assembly 101 is aligned with a first port of the beam splitting assembly 102 after passing through the fast axis collimator.

A slow axis collimator is provided on the optical path between the emitting assembly 101 and the beam splitting assembly 102, and the slow axis collimator is mounted on a slow axis collimator holder 1052, then at least one of the position of the slow axis collimator and the position of the emission board 1011 is adjusted so that the outgoing light signal emitted from the emitting assembly 101 is aligned with the first port of the beam splitting assembly 102 after passing through the fast axis collimator and the slow axis collimator. In this case, the outgoing light signal is an almost parallel collimated light.

S2014, the emission board adjustment base 1012 and the slow axis collimator holder 1052 are fixedly connected to the base 100 to completely the installation of the emitting assembly 101 and the slow axis collimator.

Specifically, the connection between the fast axis collimator barrel 1051 and the base 100, the connection between the slow axis collimator holder 1052 and the base 100, and the connection between the emission board adjustment base 1012 and the base 100 may be snap connections, screw connections, connection through pin(s), adhesive connections, or any combinations thereof.

S202, fixing the reflector supporting assembly 1041 of the reflector assembly 104 above the beam splitting assembly 102, and aligning an light input port of the reflector assembly 104 with the second port of the beam splitting assembly 102.

Specifically, after the emitting assembly 101, the beam splitting assembly 102, and the collimating assembly 105 are installed, the reflector supporting assembly 1041 of the reflector assembly 104 is fixed above the beam splitter supporting assembly 1021 of the beam splitting assembly 102, and the light input port of the reflector assembly 104 is aligned with the second port of the beam splitting assembly 102. The connection between the reflector supporting assembly 1041 and the beam splitter supporting assembly 1021 may a snap connection, a screw connection, a connection through pin(s), an adhesive connection, or any combinations thereof.

S203, aligning the light input port of the receiving assembly 103 with the light exit port of the reflector assembly 104, and then fixing the receiving assembly 103 to the reflector assembly 104.

Specifically, after the reflector assembly 104 is installed, the light input port of the receiving assembly 103 is aligned with the light exit port of the reflector assembly 104, and then the receiving assembly 103 is fixed to the reflector assembly 104.

Step S203 further includes:

S2031, a focusing assembly 106 is further provided on the optical path between the receiving board and the reflector assembly 104. At least one focusing lens is placed in a focusing lens barrel 1061.

S2032, one end of the focusing lens barrel 1061 is aligned with the light exit port of the reflector assembly 104, and is fixedly connected to the reflector supporting assembly 1041; a light input port of the receiving board is aligned with the other end of the focusing lens barrel 1061, and the receiving board is fixed to the receiving board base 1031. The position of the receiving board base 1031 may be adjusted so that the receiving board is perpendicular to the optical axis of the focusing lens barrel 1061.

S2033, the receiving board base 1031 and the focusing lens barrel 1061 are fixedly connected, so as to finish the fixation of the reflector assembly 104 and the receiving assembly 103.

Specifically, the connection between the reflector supporting assembly 1041 and the focusing lens barrel 1061, and the connection between the receiving board base 1031 and the focusing lens barrel 1061 may be snap connections, screw connections, connection through pin(s), adhesive connections, or any combinations thereof.

S204, receiving the reflected light signal by the receiving assembly 103.

Before adjustment, a known target object may be set in the detection region, and the distance between the target object and the Lidar 1 is known. Specifically, an outgoing light signal emitted by the emitting assembly 101 enters the first port of the beam splitting assembly 102 and exits from a third port thereof, and is directed toward the detection region. At least part of the outgoing light signal is reflected by the target object in the detection region to become a reflected light signal, the reflected light signal then enters the third port of the beam splitting assembly 102, then is deflected by the beam splitting assembly 102, and exits from the second port thereof. The reflected light signal is reflected by the reflector assembly 104 toward the receiving assembly 103. The reflected light signal is obtained by a detector on a receiving board of the receiving assembly 103, and then converted into an electrical signal output by the detector. Specifically, the receiving board may be at least one of APD and SiPD. The optical paths of the outgoing light signal and the reflected light signal between the beam splitting assembly 102 and the target object are coaxial.

S205, Comparing the reflected light signal obtained by the receiving assembly 103 with a preset light signal threshold.

The preset optical signal threshold may be a preset voltage signal threshold or a preset current signal threshold. Specifically, after obtaining the reflected light signal, the detector may convert the reflected light signal into a voltage signal or a current signal; and then the voltage signal may be compared with a preset voltage signal threshold, or the current signal may be compared with a preset current signal threshold.

S206. When the reflected light signal is lower than the preset light signal threshold, adjusting at least one of a position of the reflector 1043 or an angle of the reflector 1043.

For example, the reflected light signal is converted to a voltage signal by detector in the receiving assembly 103. When the comparison result shows that the voltage signal is lower than the preset voltage signal threshold, the position and angle of the reflector 1043 in the reflector assembly 104 may be adjusted to compensate for the errors accumulated in the previous steps. The angle, distance or the like of the reflector 1043 may be adjusted to make the voltage signal output by the receiving assembly 103 meet the requirements. According to an embodiment, the reflector 1043 is fixed on a reflector cover 1042, so the reflector 1043 may be adjusted by means of adjusting the reflector cover 1042.

S207, when the reflected light signal is greater than or equal to the preset light signal threshold, determining that the current positions of the reflector 1043 and the receiving assembly 103 are properly positioned.

Accordingly, when the reflector 1043 is property positioned as described above, the receiving assembly 103 has a good receiving effect.

In the foregoing example where the reflected light signal is converted to a voltage signal on the receiving board of the receiving assembly 103, when the comparison result is that the voltage signal is greater than or equal to the preset voltage signal threshold, the current position of the reflector 1043 is marked as a desired position of the reflector.

S208, according to the desired of the reflector, fixedly mounting the reflector 1043 on the reflector supporting assembly 1041 corresponding to the proper position. Additionally or alternatively, according to the desired position of the receiving assembly 103, receiving assembly 103 is fixedly connected to the reflector assembly 104.

Specifically, the reflector 1043 is fixed on the reflector cover 1042; according to the desired position of the reflector 1043, the reflector cover 1042 is fixed on the reflector supporting assembly 1041. In this case, the connection between the reflector cover 1042 and the reflector supporting assembly 1041 may be an adhesive connection, so as to fix the desired position of the reflector 1043 obtained through the foregoing process.

According to some embodiments, when detecting a target object, an outgoing light signal emitted by the emitting assembly 101 passes through the beam splitting assembly 102, and is directed to a detection region; at least a part of the outgoing light signal is then reflected by the target object in the detection region to become a reflected light signal, the reflected light signal is deflected by the beam splitting assembly 102 to the reflector assembly 104; next, the reflector assembly 104 reflects the reflected light signal toward the receiving assembly 103. In this embodiment, the reflector assembly 104 is used to reflect the reflected light signal; the optical path of the reflected light signal is thus folded, so that the space taken by the optical transceiver component 10 may be reduced. As a result, the volume of the Lidar 1 may be reduced.

During a process of adjusting the Lidar 1, the beam splitting assembly 102 and the base 100 are integrated or fixedly connected together. According to the position of the beam splitting assembly 102, the light exit port of the emitting assembly 101 is aligned with the first port of the beam splitting assembly 102. The emitting assembly 101 may then be fixed on the base 100. The light input port of the reflector assembly 104 is aligned with the second port of the beam splitting assembly 102; the reflector supporting assembly 1041 of the reflector assembly 104 and the beam splitter supporting assembly 1021 of the beam splitting assembly 102 are fixedly connected; next the light input port of the receiving assembly 103 is aligned with the light exit port of the reflector assembly 104. The receiving assembly 103 is then fixedly connected to the reflector assembly 104. When the receiving assembly 103 obtains the reflected light signal, the reflected light signal is compared with the preset light signal threshold. When the reflected light signal is lower than the preset light signal threshold, the position and/or the angle of the reflector 1043 in the reflector assembly 104 may be adjusted. When the reflected light signal is greater than or equal to the preset light signal threshold, it is determined that the current position of the reflector 1043 is a desired position thereof, and thus the current position of the receiving assembly 103 is also a desired position thereof; finally, the reflector 1043 is fixed on the reflector supporting assembly 1041 according to the desired position of the reflector 1043, and the receiving assembly 103 if fixedly connected to the reflector assembly 104 according to the desired position of the receiving assembly 103.

In the foregoing method, the emitting assembly 101, the beam splitting assembly 102, the reflector assembly 104 and the receiving assembly 103 of the optical transceiver component 10 are pre-adjusted before the assembling. Accordingly, when the Lidar 1 is assembled, the plurality of optical transceiver components 10 are combined together to provide the field of view angle required by the Lidar. The installation and adjustment process is simple and fast. When the emitting assembly 101 or the receiving assembly 103 of a particular optical transceiver component 10 needs to be replaced for maintenance, only the damaged part thereof are replaced and the corresponding optical transceiver component is adjusted. Accordingly, the emitting assemblies 101 and the receiving assemblies 103 of other optical transceiver components do not need to be re-adjusted. In this way, the product maintenance becomes easier and has a lower cost. In addition, each optical transceiver component 10 is individually adjusted, which ensures that the transmission and reception effects of each optical transceiver component 10 is good, and thus the detection effect of the Lidar 1 can be reliably guaranteed. Moreover, the added reflector assembly 104 can fold the optical path of the optical transceiver component 10, thus the size of the Lidar 1 may also be reduced according to the embodiments.

Figure 14:
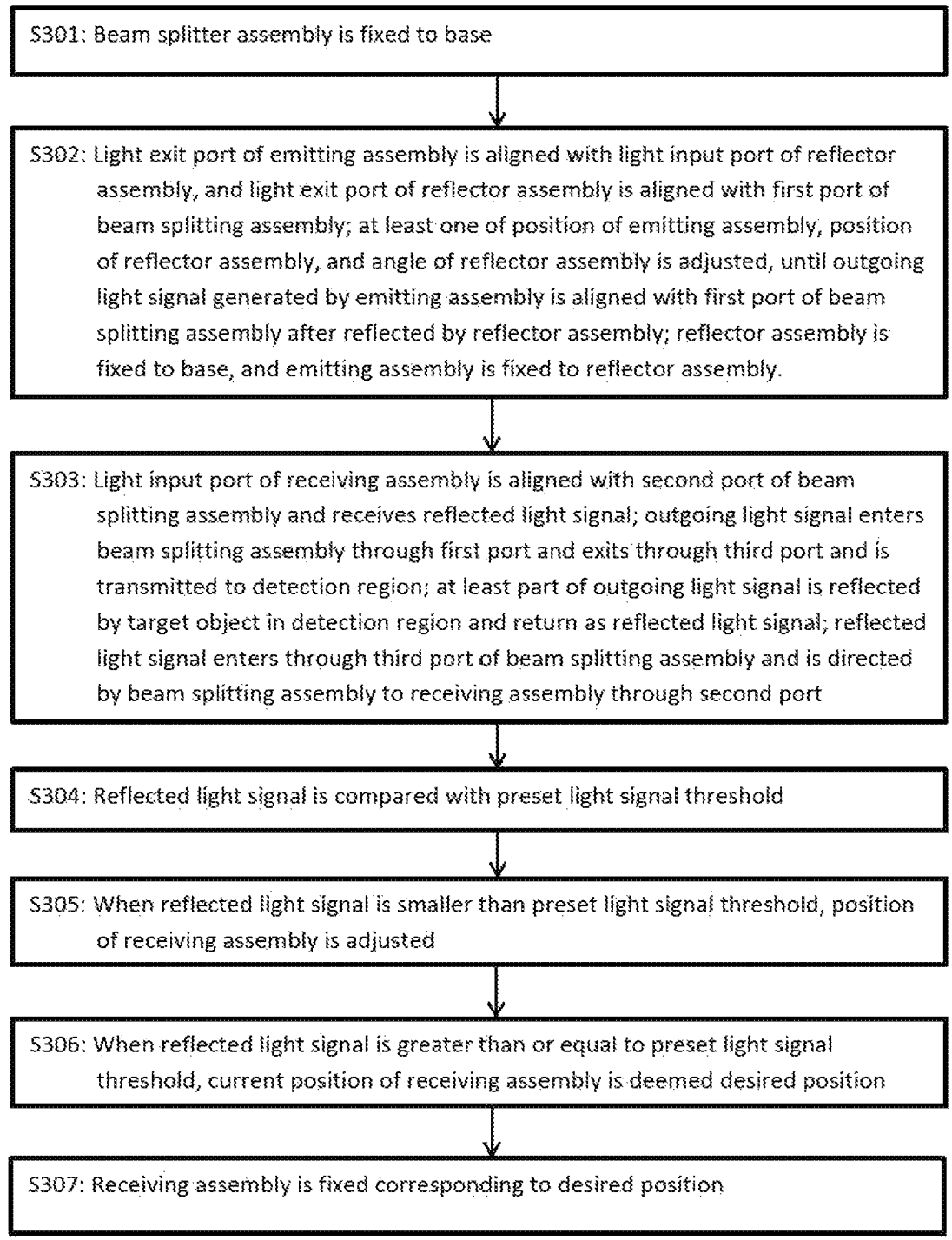
FIG. 14 is a Lidar adjustment method according to some embodiments of the present application.

FIG. 14 is a Lidar adjustment method according to some embodiments of the present application. The adjustment method shown in FIG. 14 can be applied to the embodiment shown in FIG. 6. The Lidar 1, which may be adjusted according to the embodiment, includes at least one optical transceiver component 10. The optical transceiver component 10 includes an emitting assembly 101, a beam splitting assembly 102, a receiving assembly 103, a reflector assembly 104, and a base 100. The reflector assembly 104 is disposed between the beam splitting assembly 102 and the emitting assembly 101. As shown in FIG. 14, the adjustment method may include the following steps:

S301, fixing the beam splitting assembly 102 to the base 100.

Optionally, if a secondary beam splitting assembly 107 is further included, the secondary beam splitting assembly 107 is aligned with the beam splitting assembly 102, and then integrated or fixedly connected with the base 100.

S302, aligning the light exit port of the emitting assembly 101 with the light input port of the reflector assembly 104; aligning the light exit port of the reflecting module 104 with the first port of the beam splitting assembly 102; adjusting at least one of the position of the emitting assembly 101, the position of the reflector assembly 104, and the angle of the reflector assembly 104, so that the outgoing light signal from the emitting assembly 101 is reflected by the reflector assembly 104 toward the first port of the beam splitting assembly 102. Then fixing the reflector assembly 104 to the base 100, and then fixedly mounting the emitting assembly 101 to the reflector assembly 104.

Specifically, step S302 may further includes:

S3021, a reflector 1043 is fixed on an adjusting member 1044, and the adjusting member 1044 is assembled with the reflector supporting assembly 1041.

S3022, a light exit of a collimator barrel 1053 of the collimating assembly 105 is aligned with the reflector 1043 and fixed to the reflector supporting assembly 1041; the optical fiber of the emitting assembly 101 is aligned with the light input port of the collimator barrel 1053.

S3023, the light exit port of the reflector assembly 104 is aligned with the first port of the beam splitting assembly 102 or the secondary beam splitting assembly 107, and the reflector supporting assembly 1041 is fixed to the base 100.

S3024, the angle and the position of the reflector 1043 is adjusted through the adjusting member 1044, so that the outgoing light signal emitted by the emitting assembly 101 passes through the collimating assembly 105 toward the reflector 1043. The outgoing light is then reflected by the reflector 1043 toward the first port of the beam splitting assembly 102 or the secondary beam splitting assembly 107.

Specifically, the connection between the reflector supporting assembly 1041 and the base 100 and the connection between the collimator barrel 1053 and the reflector supporting assembly 1041 may be snap connections, screw connections, connection through pin(s), adhesive connections, or any combinations thereof.

S303, aligning the light input port of the receiving assembly 103 with the second port of the beam splitting assembly 102 to receive the reflected light signal directed to the receiving assembly 103.

Specifically, the outgoing light signal emitted by the emitting assembly 101 enters the first port of the beam splitting assembly 102 and exits from the third port thereof toward a detection region. At least a part of the outgoing light signal is reflected by a target object in the detection region; the reflected light signal enters the third port of the beam splitting module 102, is deflected by the beam splitting assembly 102, and then exits from the second port thereof toward the receiving assembly 103.

Specifically, step S303 may further includes:

S3031, a focusing assembly 106 is provided on the optical path between the beam splitting assembly 102 and the receiving assembly 103. At least one focusing lens is provided in the focusing lens barrel 1061.

S3032, one end of the focusing lens barrel 1061 is aligned with the second port of the beam splitting assembly 102, and the focusing lens barrel 1061 is fixedly connected to the beam splitter supporting assembly 1021.

S3033, a light input port of a receiving board of the receiving assembly 103 is aligned with the other end of the focusing lens barrel 1061 to obtain the reflected light signal directed toward the receiving assembly 103 by the focusing assembly 106.

Before adjustment, a known target object maybe preset in the detection region, and the distance between the target object and the Lidar 1 is known. Specifically, an outgoing light signal emitted by the emitting assembly 101 enters the first port of the beam splitting assembly 102 and exits from a third port thereof, and is directed toward the detection region. The outgoing light signal may be reflected by the target object in the detection region. The reflected light signal then enters the third port of the beam splitting module 102, is deflected by the beam splitting assembly 102, and exits from the second port thereof toward the receiving assembly 103. The reflected light signal is then received by a detector on a receiving board of the receiving assembly 103 and converted into an electrical signal output by the detector. Specifically, the receiving board may be at least one of APD and SiPD.

Specifically, the connection between the focusing lens barrel 1061 and the beam splitter supporting assembly 1021 may be a snap connection, a screw connection, a connection through pin(s), an adhesive connection, or any combinations thereof.

S304, comparing the reflected light signal with a preset light signal threshold.

The preset optical signal threshold may be a preset voltage signal threshold or a preset current signal threshold. Specifically, after obtaining the reflected light signal, the detector may convert the reflected light signal into a voltage signal or a current signal; and then the voltage signal may be compared with a preset voltage signal threshold, or the current signal may be compared with a preset current signal threshold.

S305. When the reflected light signal is lower than the preset light signal threshold, adjusting the position of the receiving assembly 103.

For example, when the reflected light signal is converted to a voltage signal by the receiving assembly 103, if the voltage signal is lower than the preset voltage signal threshold, the position of the receiving assembly 103 may be adjusted, until the voltage signal output by the receiving assembly 103 meets the requirements.

S306, when the reflected light signal is greater than or equal to the preset light signal threshold, determining that the current position of the receiving assembly 103 is a proper position (desire position) of the receiving assembly 103.

In the desired position, the receiving assembly 103 has a good receiving effect. That is, the optical axis of the receiving assembly 103 is substantially aligned with the optical axis of the focusing assembly 106.

In the foregoing example where the reflected light signal is converted to a voltage signal at the receiving assembly 103, when the comparison result obtained by the detector is that the voltage signal is greater than or equal to the preset voltage signal threshold, the current position of the receiving assembly 103 is deemed the desired position of the receiving assembly 103.

S307, fixing the receiving assembly 103 according to the proper position, such that the installation and adjustment of the entire optical transceiver component 10 is completed.

When the field of view angle of a single optical transceiver component 10 cannot meet the requirement, the Lidar 1 may be provided with a plurality of the optical transceiver components 10. The Lidar 1 may further include a bottom plate 400, a hardware component 30, a galvanometer assembly 201, and a reflector assembly 202, as shown in FIGS. 10 and 11. The adjustment method shown in FIG. 14 may further include the following steps (not shown in FIG. 14):

S308, mounting the galvanometer assembly 201 on the bottom plate 400.

S309, placing at least one of the assembled optical transceiver components 10 in a mounting position on the bottom plate 400.

S310, fixedly mounting at least one reflector assembly 202 i on the bottom plate 400.

S311, one-to-one arranging the optical transceiver component 10 and the reflector assembly 202, adjusting at least one of the position of the optical transceiver component 10 and the position of the corresponding reflector assembly 202 to make the outgoing light signal from the optical transceiver component 10 align with the corresponding reflector assembly 202.

S312, fixing the optical transceiver component 10 to the bottom plate 400.

S313, fixing the hardware component 30 to the bottom plate 400.

S314. After the internal adjustment is completed, further assembling the cover and the bottom plate 400, and then packaging the finished assembly.

According to a further embodiment, the optical transceiver component 10 may further include a reflector assembly 104. The reflector assembly 104 is used to reflect the outgoing light signal, and the outgoing light path is thus folded to become shorter. In this way, the volume taken the optical transceiver component 10 may be reduced, and accordingly, the volume of the Lidar is reduced as well.

In a Lidar installation and adjustment process applicable to the embodiment shown in FIG. 14, the beam splitting assembly 102 and the base 100 are integrated or fixedly connected with each other; the light exit port of the emitting assembly 101 is aligned with the light input port of the reflector assembly 104, the emitting assembly 101 and the reflector assembly 104 are fixed; the light exit port of the reflector assembly 104 is aligned with the first port of the beam splitting assembly 102, the reflector assembly 104 is fixed on the base 100; next the light input port of the receiving assembly 103 is aligned with the second port of the beam splitting assembly 102, and the receiving module 103 receives the reflected light signal. Next, the reflected light signal is compared with the preset light signal threshold; when the reflected light signal is lower than the preset light signal threshold, the position and the angle of the receiving assembly 103 are adjusted. When the reflected light signal is greater than or equal to the preset light signal threshold, it is determined that the current position of the receiving assembly 103 is the desired position of the receiving assembly 103; next the receiving assembly 103 is fixedly installed according to the desired position of the receiving assembly 103.

The Lidar includes at least one optical transceiver component 10. The emitting assembly 101, the beam splitting assembly 102, and the receiving assembly 103 of each optical transceiver component 10 may be adjusted before assembling Lidar 1. After the optical transceiver component 10 is adjusted, it may be mounted on the bottom plate 400 as a whole. In addition, there is also a scanning component 20 on the bottom plate 400. After being adjusted, both the optical transceiver component 10 and the scanning component 20 may be fixed to the bottom plate 400. Next, the hardware component 30 is fixed to the bottom plate 400 for internal adjustment. Finally, the cover and the bottom plate 400 are assembled and packaged to complete the entire installation and adjustment of the Lidar.

When the Lidar is assembled, the plurality of optical transceiver components 10 are combined together to provide the field of view angle required by the Lidar 1. The installation and adjustment process is simple and fast. When the emitting assembly 101 or the receiving assembly 102 needs to be replaced for maintenance, only the damaged part thereof needs to be replaced and then a corresponding optical transceiver component is readjusted. Accordingly, the emitting assemblies 101 and the receiving assembly 102 of other optical transceiver components do not need to be re-adjusted. In this way, the product maintenance becomes easier and has a lower cost. In addition, each optical transceiver component 10 is individually adjusted, which ensures that the transmission and reception of each optical transceiver component 10 is good, and thus the detection effect of the Lidar can be reliably guaranteed.

The technical features of the embodiments described above may be combined in many different ways. In order to make the description concise, not every possible combination of the technical features in the above embodiments has been described herein. However, as long as there is no contradiction in the combination of these technical features, such a combination should be considered as within the scope disclosed in this specification. It should be noted that "in an embodiment," "for example," "another example," and the like in the present application are intended to illustrate the present application instead of limiting the present application.

The aforementioned embodiments are merely a few embodiments of the present disclosure. Their descriptions are specific and detailed, but should not be understood as the limitations on the scope of the present disclosure. It is appreciated by a person of ordinary skill in the art that many variations and improvements may be made without departing from the concept of the present disclosure, and these variations and improvements all fall within the scope of protection of the present application. Therefore, the scope of protection of the present application shall be defined by the appended claims.

The invention claimed is:

1. An optical device, comprising:
  an emitting assembly configured to emit an outgoing light signal;
  a beam splitting assembly configured to pass the outgoing light signal from the emitting assembly to a detection region, receive a reflected light signal from the detection region, and modify a transmission direction of the reflected light signal, wherein the reflected light signal comprises at least a part of the outgoing light signal reflected by an object in the detection region;
  a collimating assembly disposed between the emitting assembly and the beam splitting assembly and configured to modify emission characteristics of the outgoing light signal along a first axis and a second axis, the first axis and the second axis being perpendicular to the transmission direction; and
  a receiving assembly configured to receive the reflected light signal from the beam splitting assembly after the direction modification and generate an electrical signal in response to the reflected light signal.

2. The optical device of claim 1, further comprising a reflector assembly disposed between the beam splitting assembly and the receiving assembly and configured to direct the reflected light signal from the beam splitting assembly to the receiving assembly.

3. The optical device of claim 1, further comprising a reflector assembly disposed between the emitting assembly and the beam splitting assembly and configured to direct the outgoing light signal from the emitting assembly to the beam splitting assembly.

4. The optical device of claim 1, wherein the first axis is a fast axis and the second axis is a slow axis of the outgoing light signal.

5. The optical device of claim 1, further including a focusing assembly configured to receive the reflected light signal from the beam splitting assembly and converge the reflected light signal onto the receiving assembly.

6. The optical device of claim 1, further comprising a secondary beam splitting assembly disposed between the emitting assembly and the beam splitting assembly and configured to remove an unwanted part of the outgoing light signal.

7. The optical device of claim 1, further comprising a beam reducing assembly disposed between the emitting assembly and the beam splitting assembly and configured to reduce a dimension of the outgoing light signal.

8. The optical device of claim 7, wherein the beam reducing assembly reduces the dimension of the outgoing light signal by one-half.

9. The optical device of claim 8, wherein the dimension reduction is measured along a direction perpendicular to the transmission direction.

10. A method for adjusting an optical device, comprising:
  aligning an emitting assembly and a beam splitting assembly;
  coupling a receiving assembly to the beam splitting assembly;
  emitting, by the emitting assembly, an outgoing light signal to a detection region through the beam splitting assembly along a first transmission direction, wherein the beam splitting assembly receives a reflected light signal from the detection region and directs the reflected light signal along a second transmission direction to the receiving assembly, the reflected light signal comprising at least a part of the outgoing light signal reflected from the detection region;
  detecting the reflected light signal directed from the beam splitting assembly to the receiving assembly;
  comparing the reflected light signal with a threshold value; and
  adjusting an optical transceiver component until the reflected light signal received by the receiving assembly is greater than or equal to the threshold value.

11. The method of claim 10, wherein adjusting the optical transceiver component until the reflected light signal received by the receiving assembly is greater than or equal to the threshold value further comprises:
  adjusting the receiving assembly with respect to the beam splitting assembly until the reflected light signal received by the receiving assembly is greater than or equal to the threshold value.

12. The method of claim 11, further comprising fixing the receiving assembly with respect to the beam splitting assembly.

13. The method of claim 12, wherein aligning the emitting assembly and a beam splitting assembly further comprises:
  coupling the emitting assembly to a reflector assembly; and
  aligning the emitting assembly, the reflector assembly and the beam splitting assembly.

14. The method of claim 13, wherein fixing the emitting assembly with respect to the beam splitting assembly further comprises:
  fixing the reflector assembly and the beam splitting assembly to a bottom plate; and
  fixing the emitting assembly to the reflector assembly.

15. The method of claim 10, further comprising fixing a reflector assembly to the beam splitting assembly,
  wherein coupling the receiving assembly to the beam splitting assembly further comprises:
    aligning the receiving assembly with the reflector assembly;
    coupling the receiving assembly to the beam splitting assembly through the reflector assembly fixed to the beam splitting assembly; and
    fixing the receiving assembly to the reflector assembly.

16. The method of claim 15, wherein adjusting the optical transceiver component until the reflected light signal received by the receiving assembly is greater than or equal to the threshold value further comprises:
  adjusting a reflector within the reflector assembly until the reflected light signal received by the receiving assembly is greater than or equal to the threshold value; and
  fixing the reflector within the reflector assembly.

17. An optical device, comprising:
an emitting assembly configured to emit an outgoing light signal;
a beam splitting assembly configured to pass the outgoing light signal from the emitting assembly to a detection region, receive a reflected light signal from the detection region, and modify a transmission direction of the reflected light signal, wherein the reflected light signal comprises at least a part of the outgoing light signal reflected by an object in the detection region;
a beam reducing assembly disposed between the emitting assembly and the beam splitting assembly and configured to reduce a dimension of the outgoing light signal; and
a receiving assembly configured to receive the reflected light signal from the beam splitting assembly after the direction modification and generate an electrical signal in response to the reflected light signal.

18. The optical device of claim 17, wherein the beam reducing assembly reduces the dimension of the outgoing light signal by one-half.

19. The optical device of claim 18, wherein the dimension reduction is measured along a direction perpendicular to the transmission direction.

* * * * *